(12) United States Patent
Ikegami

(10) Patent No.: US 8,164,552 B2
(45) Date of Patent: Apr. 24, 2012

(54) DISPLAY DEVICE AND DISPLAY MEDIUM USING THE SAME

(75) Inventor: Kanami Ikegami, Shinjuku-ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 834 days.

(21) Appl. No.: 12/282,514

(22) PCT Filed: Jan. 18, 2008

(86) PCT No.: PCT/JP2008/051026
§ 371 (c)(1),
(2), (4) Date: Sep. 11, 2008

(87) PCT Pub. No.: WO2008/090967
PCT Pub. Date: Jul. 31, 2008

(65) Prior Publication Data
US 2009/0046045 A1    Feb. 19, 2009

(30) Foreign Application Priority Data
Jan. 26, 2007   (JP) .................................. 2007-016409

(51) Int. Cl.
G09G 3/36   (2006.01)
(52) U.S. Cl. .............. 345/87; 345/84; 345/107; 359/296
(58) Field of Classification Search .............. 345/84, 345/87–102, 38, 50, 107; 359/296
See application file for complete search history.

(56) References Cited

U.S. PATENT DOCUMENTS
5,808,593 A * 9/1998 Sheridon ................... 345/84
7,898,718 B2 * 3/2011 Feenstra et al. ............ 359/253

FOREIGN PATENT DOCUMENTS
| | | |
|---|---|---|
| JP | 2001 356374 | 12/2001 |
| JP | 2004 144998 | 5/2004 |
| JP | 2004 252444 | 9/2004 |
| JP | 2006 243169 | 9/2006 |
| WO | 2007 013682 | 2/2007 |

OTHER PUBLICATIONS

U.S. Appl. No. 12/888,065, filed Sep. 22, 2010, Ikegami, et al.
U.S. Appl. No. 11/573,593, filed Feb. 12, 2007, Ikegami, et al.

* cited by examiner

*Primary Examiner* — Kevin M Nguyen
*Assistant Examiner* — Kenneth B Lee, Jr.
(74) *Attorney, Agent, or Firm* — Oblon, Spivak, McClelland, Maier & Neustadt, L.L.P.

(57) ABSTRACT

A display system is built up of at least one display cell including an assembly containing a set of substrates at least one of which is transparent, a wall portion for supporting the set of substrates in opposition to one another defining a liquid confining space, a $1^{st}$-A electrode and a $1^{st}$-B electrode located on the side of the substrate facing the liquid confining space in a mutually electrically independent way, an insulating layer for covering the $1^{st}$-A electrode and the $1^{st}$-B electrode, an intermediate partition located at a boundary site between the $1^{st}$-A electrode and the $1^{st}$-B electrode and the second electrode located on the side of another substrate facing the liquid confining space, such that $\theta 1 < \theta 2 < \theta 3$, where $\theta 1$, $\theta 2$ and $\theta 3$ relate to hydrophilicity of the exposed wall portion, hydrophilicity of the intermediate partition, and hydrophilicity of the insulating layer.

25 Claims, 11 Drawing Sheets

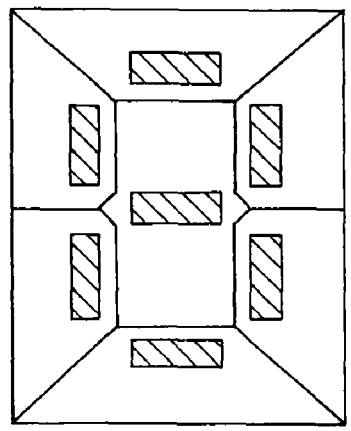
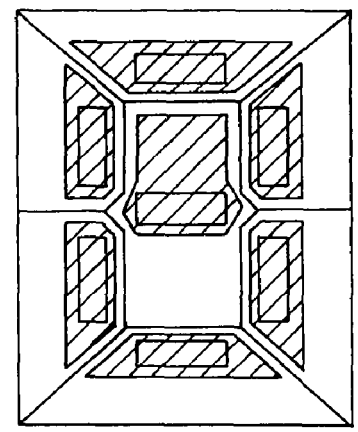
FIG. 14A  FIG. 14B
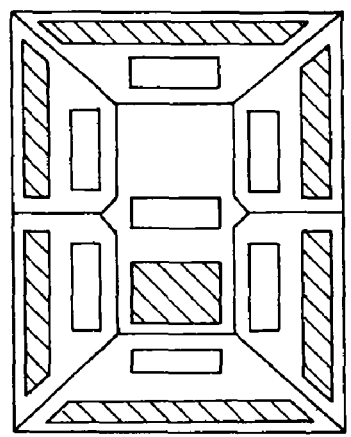
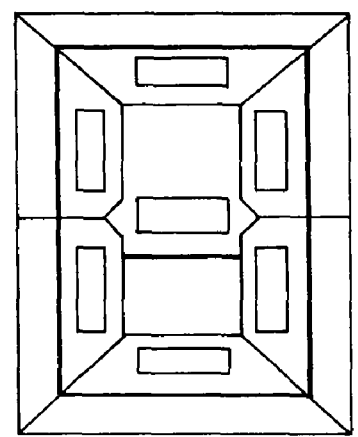
FIG. 14C  FIG. 14D

DISPLAY DEVICE AND DISPLAY MEDIUM USING THE SAME

ART FIELD

The present invention relates generally to a display system harnessing electrophoresis and a display medium incorporating that display system, and more particularly a display system capable of sustaining a display state even after an applied voltage is shut off and a display medium.

BACKGROUND ART

In recent years, there has been a display system developed, which harnesses a phenomenon in which, by applying voltage to an electrophoresis display device wherein a microcapsule having electrophoresis particles and a dispersion medium is interleaved as that electrophoresis display device between two electrodes, the electrophoresis particles migrate through the microcapsule toward electrodes having different polarities by way of electrophoresis (see JP-A's 2002-357853 and 2002-333643). That display system is capable of producing color displays, because microcapsules containing yellow, magenta and cyan dispersion media, respectively, are used with one each microcapsule interleaved between a pair of associated electrodes for each color.

There has also been a display system developed, in which a plurality of cells, each having an electrode having a hydrophobic surface in opposition to an electrode having a hydrophilic surface, are filled with water and colored oil, so that at no applied voltage, the colored oil spreads over the hydrophobic electrode surface, and at a voltage applied between the electrodes, the colored oil migrates toward and builds up on a given site of the hydrophobic electrode surface (see International Publication Nos. WO 2004/104670, WO 2004/068208 and WO 2004/104671). This display system, too, is capable of producing color displays by use of oils colored in yellow, magenta and cyan.

With the prior art display system set forth in JP-A's 2002-357853 and 2002-333643, however, there is a problem that it is difficult to arrange microcapsules without giving rise to defects, resulting in an image quality deterioration.

With the prior art display system set forth in International Publication Nos. WO 2004/104670, WO 2004/068208 and WO 2004/104671, a problem is that when the application of voltage is shut off, the oil migrating to and building up on the given site of the hydrophobic electrode comes to spread over the hydrophobic electrode surface; there is lack of any memory capability. This requires perpetual power supply, leading to a failure in cutting down power consumption.

DISCLOSURE OF THE INVENTION

The object of the present invention is to provide a fast-response, low-consumption display system and a display medium incorporating the same.

According to the invention, such an object is accomplishable by the provision of a display system built up of at least one display cell comprising an assembly which has at least a first electrode and a second electrode and in which there are mutually non-miscible first and second liquids filled, wherein either one of said first and second electrodes is electrically insulated from said first and second liquids, said first liquid has electrical conductivity or polarity, and voltage is applied to one or both of said first and second electrodes, whereby said first liquid and said second liquid vary in position to produce a display, characterized in that:

said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on a side of one substrate that faces said liquid confining space in an electrically independent way, an insulating layer for covering said $1^{st}$-A electrode and said $1^{st}$-B electrode, an intermediate partition located at a boundary site between said $1^{st}$-A electrode and said $1^{st}$-B electrode, and a second electrode that is located on another substrate that faces said liquid confining space, wherein said $1^{st}$-A electrode and said $1^{st}$-B electrode are electrically insulated from said first liquid and said second liquid; at a voltage applied between said $1^{st}$-A electrode and said second electrodes or between said $1^{st}$-B electrode and said second electrode, said second liquid goes over said intermediate partition in such a way as to be able to move between on said $1^{st}$-A electrode and on said $1^{st}$-B electrode; said intermediate partition is a liquid retainer means which, even after the applied voltage is shut off at a position where said first liquid and said second liquid have moved to, permits said first liquid and said second liquid to be held at the position where they have moved to, producing memory capability; and there is a specific relation: $\theta1 < \theta2 \leq \theta3$ where $\theta1$ is an angle of contact with a water droplet indicative of hydrophilicity of a site of said wall portion exposed in said assembly, $\theta2$ is an angle of contact with a water droplet indicative of hydrophilicity of said intermediate partition, and $\theta3$ is an angle of contact with a water droplet indicative of hydrophilicity of said insulating layer.

In an embodiment of the invention, said intermediate partition has a height enough to keep said second liquid resting on said $1^{st}$-A electrode or said $1^{st}$-B electrode from going over it when the applied voltage is shut off.

The embodiment here makes surer the retaining by the intermediate partition of the second liquid that have moved or migrated.

The invention also provides a display system built up of at least one display cell comprising an assembly which has at least a first electrode and a second electrode and in which there are mutually non-miscible first and second liquids filled, wherein either one of said first and second electrodes is electrically insulated from said first and second liquids, said first liquid has electrical conductivity or polarity, and voltage is applied to one or both of said first and second electrodes, whereby said first liquid and said second liquid vary in position to produce a display, wherein said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on a side of one substrate that faces said liquid confining space in an electrically independent way, an insulating layer for covering said $1^{st}$-A electrode and said $1^{st}$-B electrode, an intermediate partition located at a boundary site between said $1^{st}$-A electrode and said $1^{st}$-B electrode to divide said liquid confining space in a direction along the surfaces of said substrates, and a second electrode that is located on another substrate that faces said liquid confining space, wherein said $1^{st}$-A electrode and said $1^{st}$-B electrode are electrically insulated from said first liquid and said second liquid; said intermediate partition has an opening that becomes a liquid flow passage; at a voltage applied between said $1^{st}$-A electrode and said second electrodes or between said $1^{st}$-B electrode and said second electrode, said second liquid passes through said opening in said intermediate partition in such a way as to be able to move between on said $1^{st}$-A electrode and on said $1^{st}$-B electrode; said intermediate partition is a liquid retainer means which, even after the applied voltage is shut off at a position where said first liquid and said second liquid have moved to, permits said first liquid and said second liquid to be held at the position where they have moved to, producing memory capability; and there is a specific relation: $\theta1<\theta2\leqq\theta3$ where $\theta1$ is an angle of contact with a water droplet indicative of hydrophilicity of a site of said wall portion exposed in said assembly, $\theta2$ is an angle of contact with a water droplet indicative of hydrophilicity of said intermediate partition, and $\theta3$ is an angle of contact with a water droplet indicative of hydrophilicity of said insulating layer.

In an embodiment of the invention, said second liquid has a surface tension of 10 to 73 dyne/cm at 20° C., and said opening in said intermediate partition has a width of 1 to 1,000 μm.

The embodiment here makes surer the retaining by the intermediate partition of the second liquid that have moved or migrated.

Further, the invention provides a display system built up of at least one display cell comprising an assembly which has at least a first electrode and a second electrode and in which there are mutually non-miscible first and second liquids filled, wherein either one of said first and second electrodes is electrically insulated from said first and second liquids, said first liquid has electrical conductivity or polarity, and voltage is applied to one or both of said first and second electrodes, whereby said first liquid and said second liquid vary in position to produce a display, wherein said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on a side of one substrate that faces said liquid confining space in an electrically independent way, an insulating layer for covering said $1^{st}$-A electrode and said $1^{st}$-B electrode, a memory layer positioned at a boundary site between said $1^{st}$-A electrode and said $1^{st}$-B electrode, and a second electrode that is located on another substrate that faces said liquid confining space, wherein said $1^{st}$-A electrode and said $1^{st}$-B electrode are electrically insulated from said first liquid and said second liquid; at a voltage applied between said $1^{st}$-A electrode and said second electrodes or between said $1^{st}$-B electrode and said second electrode, said second liquid goes over said memory layer in such a way as to be able to move between on said $1^{st}$-A electrode and on said $1^{st}$-B electrode; said memory layer is a liquid retainer means which, even after the applied voltage is shut off at a position where said first liquid and said second liquid have moved to, permits said first liquid and said second liquid to be held at the position where they have moved to, producing memory capability; and there is a specific relation: $\theta1<\theta2<\theta3$ where $\theta1$ is an angle of contact with a water droplet indicative of hydrophilicity of a site of said wall portion exposed in said assembly, $\theta2$ is an angle of contact with a water droplet indicative of hydrophilicity of said memory layer, and $\theta3$ is an angle of contact with a water droplet indicative of hydrophilicity of said insulating layer.

In an embodiment of the invention, said memory layer has electrical insulation.

The embodiment here makes layer construction simpler and production easier.

In an embodiment of the invention, said insulating layer has a covering layer thereon, said memory layer is positioned at the boundary site between said $1^{st}$-A electrode and said $1^{st}$-B electrode and on a portion of said insulating layer with none of said covering layer formed, and an angle of contact with a water droplet, $\theta3'$, indicative of hydrophilicity of said covering layer is greater than the angle of contact with a water droplet, $\theta2$, indicative of hydrophilicity of said memory layer.

The embodiment here makes sure a plentiful selection of materials forming the insulating layer, the covering layer, and the memory layer.

In another embodiment of the invention, said memory layer is configured as jutting out toward said liquid confining space side.

This embodiment makes surer the retaining by the memory layer of the second liquid that have moved or migrated.

In yet another embodiment of the invention, a desired pattern of light block film is provided externally of said transparent substrate on a display viewing side.

This embodiment enables on/off displays to be implemented depending on whether or not the second liquid rests on the electrode surface at a site with none of the light block film found.

In a further embodiment of the invention, said second liquid is colored oil.

This embodiment enables information or the like to be displayed in any desired color.

In a further embodiment of the invention, there is a reflection type display where light reflected from within said display cell is viewed, and the colored oil that is said second liquid filled in each display cell is any one of yellow, magenta, and cyan.

This embodiment is capable of producing full-color displays in the reflection mode.

In a further embodiment of the invention, there is a transmission type display where light transmitting through said display cell is viewed, and said first liquid is colored water while the colored oil that is said second liquid is a light blocking black oil.

This embodiment is capable of producing displays colored in the color transmitting through the colored water and black.

In a further embodiment of the invention, said $1^{st}$-A electrode and said $1^{st}$-B electrode for each display cell are identical in configuration and position.

With this embodiment, the display system is capable of having uniform displayer performance in its entirety.

The aforesaid inventive display system is capable of producing a fast-response display by changes in the positions of the first and second liquids due to the application of voltage between the $1^{st}$-A electrode and the second electrode or between the $1^{st}$-B electrode and the second electrode, and the intermediate partition or the memory layer ensures that even after the applied voltage is shut off, the first and second liquids that have moved are retained intact to produce memory capability, dispensing with perpetual power supply and making sure fast-response, low-consumption displays.

The display medium of the invention comprises at least one such display system as described above, and includes an input terminal for feeding power and signals from external equipment to each display cell in the display system, wherein at that input terminal the display medium can be connected to or disconnected from the external equipment.

The inventive display medium as described above keeps memory capability going on even after disconnected from the external equipment; information can be carried around with the display medium only because of no need of perpetual power supply.

BRIEF EXPLANATION OF THE DRAWINGS

FIGS. 14A, 14B, 14C and 14D are illustrative of how to fabricate the display system in one example of the invention.

BEST MODE FOR CARRYING OUT THE INVENTION

Embodiments of the invention are now explained with reference to the accompanying drawings.

[Display System]

Figure 1:
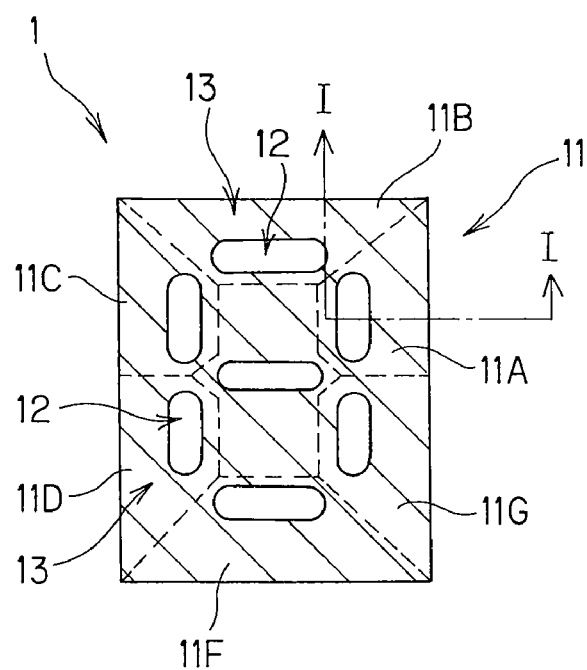
FIG. 1 is illustrative in plan of one embodiment of the display system according to the invention.

FIG. 1 is illustrative in plan of one embodiment of the display system according to the invention. As shown in FIG. 1, a display system 1 of the invention comprises a plurality of display cells 11 (seven display cells 11A, 11B, 11C, 11D, 11E, 11F, 11G are depicted in FIG. 1). Each display cell 11 is built up of an assembly which has at least a first electrode and a second electrode, and in which mutually non-miscible first and second liquids are filled. Either one of the first and second electrodes is electrically insulated from the first and second liquids, with the first liquid having electrical conductivity or polarity. By the application of voltage to one or both of the first and second electrodes, the first and second liquids are displaced to produce a display. Each display cell 11 comprises a pixel segment 12 and a space segment 13, wherein the pixel segment 12 is capable of producing an on/off display by displacements of the first and second liquids upon voltage applied on it, so that the display system 1 can provide a display of numeric information of "0" to "9". In the display system 1 of the invention, the pixel segment 12 of each display cell 11 has such memory capability as can keep on/off displays going on even after the applied voltage is shut off.

In FIG. 1, it is noted that the boundary line for each display cell 11 is indicated by chain lines and the space segment 13 is indicated by oblique lines.

[FIRST EMBODIMENT]

Figure 2:
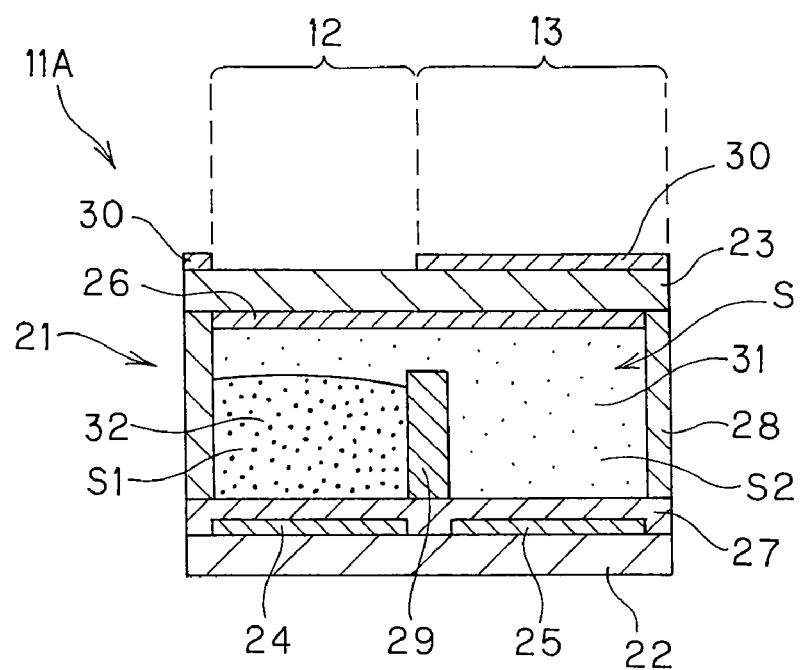
FIG. 2 is an enlarged, longitudinally sectioned view as taken on line I-I of the display system shown in FIG. 1.

FIG. 2 is an enlarged, longitudinally sectioned view of the first embodiment of the display system according to the invention, indicative of the structure of one display cell in a longitudinal section as taken on line I-I in FIG. 1. As shown in FIG. 2, a display cell 11A is built up of an assembly 21 in which a first liquid 31 having electrical conductivity or polarity and a second hydrophobic liquid 32 are filled. Note here that display cells other than 11A, too, have a similar structure as shown in FIG. 2.

The assembly 21 comprises a set of substrates 22 and 23 and a wall portion 28 for supporting them in opposition to one another to define a liquid confining space S. On a side that faces the liquid confining space S, one substrate 22 comprises a $1^{st}$-A electrode 24 and a $1^{st}$-B electrode 25 which are located in a mutually electrically independent way, and an insulating layer 27 that provides a cover for them. On that insulating layer 27, there is an intermediate partition 29 positioned at a boundary site between the $1^{st}$-A electrode 24 and the $1^{st}$-B electrode 25. Another substrate 23 comprises a second electrode 26 on the side that faces the liquid confining space S. The side of the assembly 21 that faces the substrate 23 is a display viewing side, and at least the substrate 23 is transparent. On the outside of the substrate 23, there is a light block film 30 located, a site with no light block film 30 found defining a pixel segment 12 and a site with the light block film 30 found defining a space segment 13.

In the aforesaid display cell 11A, the $1^{st}$-A electrode 24 and the $1^{st}$-B electrode 25 are electrically insulated by the insulating layer 27 from the first liquid 31 and the second liquid 32. And the invention is characterized in that between an angle $θ1$ of contact with water droplets indicative of the hydrophilicity of a site of the wall portion 28 exposed in the assembly 21, an angle $θ2$ of contact with water droplets indicative of the hydrophilicity of the intermediate partition 29 and an angle $θ3$ of contact with water droplets indicative of the hydrophilicity of the insulating layer 27, there is a specific relation $θ1<θ2≦θ3$ that makes sure such memory capability as described below. The angle of contact with water droplets indicative of hydrophilicity here is understood to mean an angle of contact as measured by the $θ/2$ technique after the lapse of a given time from the time when (a given amount of) one droplet of pure water (distilled water for liquid chromatography (made by Junsei Chemical Co. Ltd.) is added down to the object to be measured. The same shall hereinafter apply.

Figure 3A:
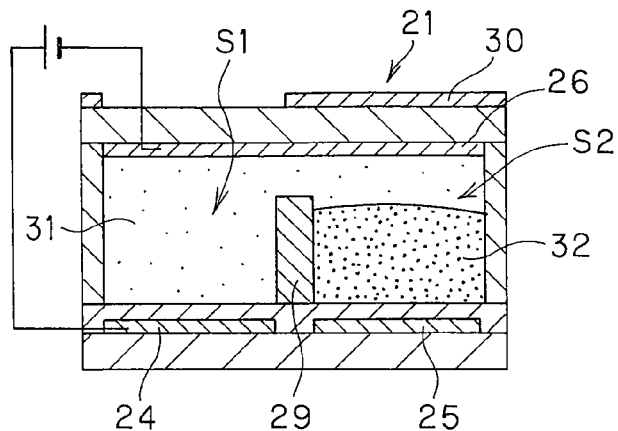
FIGS. 3A, 3B, 3C and 3D are illustrative of the operation of the display system according to the invention.
Figure 3B:
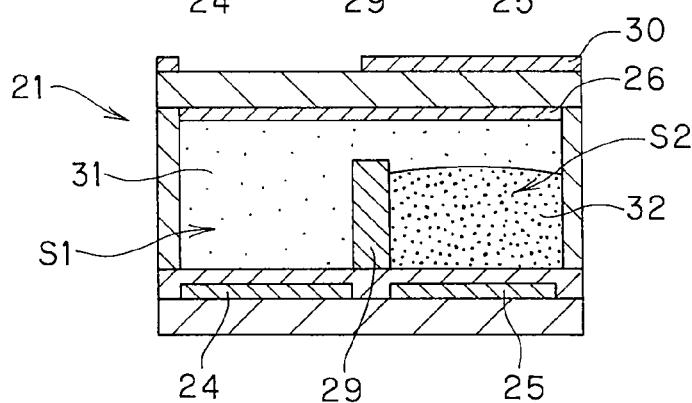
Figure 3C:
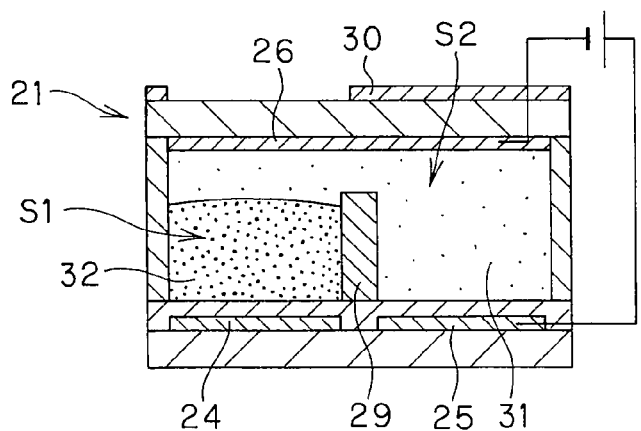
Figure 3D:
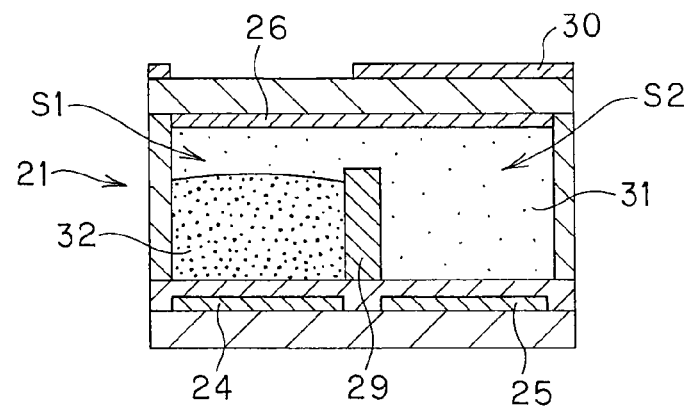

In such display cell 11A, as voltage is applied between the $1^{st}$-A electrode 24 and the second electrode 26, the second liquid 32 goes over the intermediate partition 29, migrating into a liquid confining space S2 on the $1^{st}$-B electrode 25, as shown in FIG. 3A. In this state, as the applied voltage is shut off, the intermediate partition 29 works as a liquid retainer means, so that the second liquid 32 that has migrated into the liquid confining space S2 on the $1^{st}$-B electrode 25 is retained intact, producing memory capability (FIG. 3B). As voltage is applied between the $1^{st}$-B electrode 25 and the second electrode 26, the second liquid 32 goes over the intermediate partition 29, migrating into a liquid confining space S1 on the $1^{st}$-A electrode 24 (FIG. 3C). In this state, as the applied voltage is shut off, the intermediate partition 29 works as a liquid retainer means, so that the second liquid 32 that has migrated into the liquid confining space S1 on the $1^{st}$-A electrode 24 is retained intact, producing memory capability (FIG. 3D). Such display cell 11A is capable of producing on/off displays depending on whether or not there is the second liquid 32 positioned on the electrode surface (the $1^{st}$-A electrode 24) of the site with no light block film 30 found (the pixel segment 12).

It is here appreciated that the area and configuration of the $1^{st}$-A electrode 24 and the $1^{st}$-B electrode 25, and the volume and configuration of the liquid confining space S1 on the $1^{st}$-A electrode 24 and the liquid confining space S2 on the $1^{st}$-B electrode 25 may or may not be identical.

The substrate 23 that forms a part of the display cell 11A, because of being positioned on the display viewing side as described above, is transparent. When the display cell 11A works in a reflection mode, it is not necessary for the opposite substrate 22 to be transparent; however, when the display cell 11A operates in a transmission mode, that opposite substrate must be transparent. For the substrate 22, 23, for instance, a transparent substrate such as a glass or transparent resin substrate could be used. When it is not necessary for the substrate 22 to be transparent, use may be made of a metal substrate, a ceramic substrate, an opaque glass substrate that is roughened at a surface facing away from an electrode-formation surface or provided with a metal film by means of vapor deposition, an opaque resin substrate incorporated with a dye or pigment, etc. The thickness of the substrate 22, 23 could be determined while taking what is used for it, etc. into account. For instance, an appropriate selection could be made from the range of 10 μm to 5 mm, and preferably 100 μm to 2 mm.

The $1^{st}$-A electrode 24, the $1^{st}$-B electrode 25 and the second electrode 26 that form a part of the display cell 11A are connected to voltage application units (not shown), respectively, and operate such that electrode charges are optionally controllable in the applied voltage range of, for instance, 1 to 300 V. Positioned on the display viewing side, the second electrode 26 could be provided in the form of a transparent electrode formed of, for instance, indium tin oxide (ITO), zinc oxide (ZnO), and tin oxide (SnO) by means of general film-formation techniques such as sputtering, vacuum vapor deposition, and CVD technique. The second electrode 26 could be such that the first liquid 31 is at a potential nearly equal to that of the second electrode 26; for instance, it could be formed of not only the planar electrode as described above, but also at least one needle or mesh electrode provided within the liquid confining space S as an example. When the display cell 11A operates in a transmission mode, the $1^{st}$-A electrode 24 and the $1^{st}$-B electrode 25 should be transparent as is the case with the second electrode 26. When the display cell 11A works in a reflection mode, on the other hand, the $1^{st}$-A electrode 24, and the $1^{st}$-B electrode 25 may be a metal electrode such as a Cu, Ag, Au or Al one, not a transparent one.

The insulating layer 27 that forms a part of the display cell 11A may be formed of a material that satisfies the relation ($\theta 1 < \theta 2 \leq \theta 3$) indicative of the magnitude of the water droplet contact angle, an index to the aforesaid hydrophilicity. For instance, use could be made of insulating materials such as polyimide resin, $SiO_2$, $SiN_4$, acrylic resin, perylene, fluororesin, polyamide resin, polyethylene terephthalate, polypropylene, polystyrene, silicone resin, quartz, epoxy resin, polyethylene, and polytetrafluoroethylene with or without trace currents passing through them. Among others, it is preferable to use an insulating material such as perylene, fluororesin or silicone resin, because the water droplet contact angle—indicative of hydrophilicity—of the insulating layer 27 grows so large that the wettability of the insulating layer 27 to the second liquid 32 gets better, resulting in improvements in the uniformity of the thickness of the second liquid 32.

It is here appreciated that when the display cell 11A works in a transmission mode, a transparent insulating material is selected from the foregoing for the insulating layer 27.

The wall portion 28 that forms a part of the display cell 11A may be formed such that the water droplet contact angle—indicative of hydrophilicity—of at least the site of the wall portion 28 exposed in the assembly 21 satisfies the relation ($\theta 1 < \theta 2 \leq \theta 3$) indicative of the magnitude of the water droplet contact angle, an index to the aforesaid hydrophilicity. In the invention, therefore, a wall portion having, for instance, a plurality of electrode and located all around the display area to support the substrates may not satisfy the relation about the magnitude of the water droplet contact angle, an index to hydrophilicity. For the material forming such wall portion 28, use could be made of resin materials such as ultraviolet-curing type urethane acrylate resin, epoxy resin, epoxy acrylate resin, ester acrylate resin, acrylate resin, thermosetting type phenol resin, melamine resin, polyester resin, polyurethane resin, polyimide resin, and urea resin. The liquid confining space S defined by the cooperation of the wall portion 28 with the opposite substrates 22 and 23 could be have a height in the range of, for instance, 1 to 1,000 μm.

The intermediate partition 29 that forms a part of the display cell 11A is a liquid retainer means, and has a height such that when the applied voltage is shut off, the second liquid resting on the $1^{st}$-A electrode 24 or the $1^{st}$-B electrode 25 does not go over it. While the intermediate partition 29 is configured into a rectangular shape in section as typically shown, it is appreciated that it may vary in sectional width from site to site, its upper end may be formed of a curved surface rather than a planar surface, its upper end may be of a pointed shape, etc. Such intermediate partition 29 could be formed by the lamination of photosensitive dry films at a desired thickness, followed by use of a photolithography technique or a 2P technique (a photo-polymerization process wherein a liquid ionizing radiation curable resin is coated on the surface of a master plate blank, then configured by extrusion under pressure, and finally cured by irradiation with ionizing radiation). For this, use could be made of a material that satisfies the magnitude of the aforesaid water droplet contact angle ($\theta 1 < \theta 2 \leq \theta 3$), an index to hydrophilicity, for instance, a material selected from the foregoing for the wall portion 28.

The first liquid 31 to be filled in the assembly 21 is an electrically conductive or polar liquid such as water, an alcohol or an acid. On the other hand, the second liquid 32 is a hydrophobic liquid for which use could be made of oils such as heptane, hexane, nonane, decane, octane, dodecane, tetradecane, octadecane, hexadecane, ethylene glycol monobutyl ether acetate, diethylene glycol monobutyl ether acetate, and ethyl benzoate. Between the specific gravity g1 of the first liquid 31 and the specific gravity g2 of the second liquid 32, there should preferably be a specific relation: $g1 \leq g2$.

In the invention, the second liquid 32 could be colored oil whereby information or the like could be displayed in any desired color.

When the display cell 11A operates in a transmission mode, the first liquid 31 could be a colored liquid while the second liquid 32 is a light blocking black oil, whereby on/off displays could be generated in two colors, a color transmitting through the colored liquid 31 and black.

There is no particular limitation on the light block film 30 that forms a part of the display cell 11A; a light blocking resin film and a metal film could be used alone or in combination. The light block film 30 could also be colored in any desired color.

Figure 4:
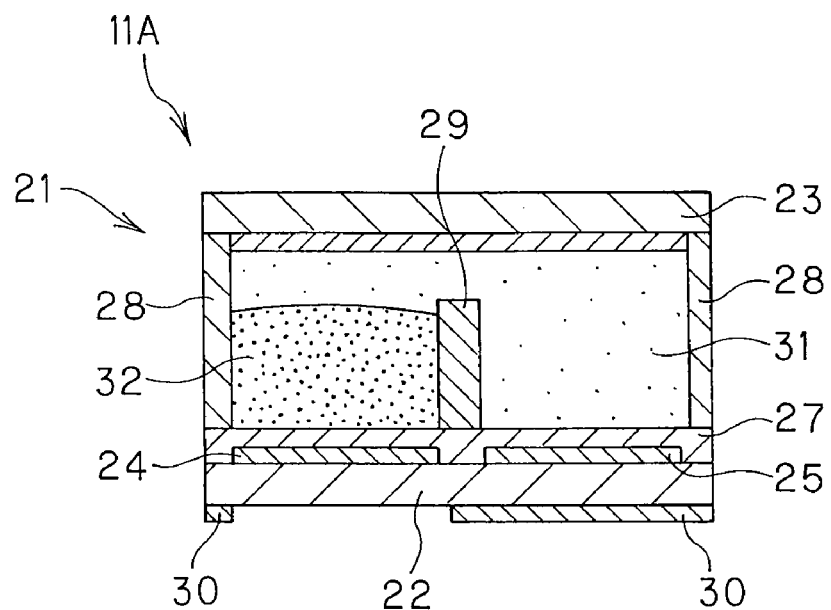
FIG. 4 is illustrative in section of another embodiment of the display system according to the invention.

The display cell 11A is not always limited to the aforesaid structure. The display cell 11A could have a structure wherein its side facing the substrate 22 is a viewing side and the light block film 30 is provided on the outside of the substrate 22, as shown typically in FIG. 4. In this case, the substrate 22 is transparent, and so are the $1^{st}$-A electrode 24, the $1^{st}$-B electrode 25 and the insulating layer 27. With the display cell 11A working in a transmission mode, the substrate 23 and the second electrode 26 are transparent, too. With no light block film 30 provided, displays could be generated by virtue of displacements of the first and second liquid 31 and 32 due to their movement.

Figure 5:
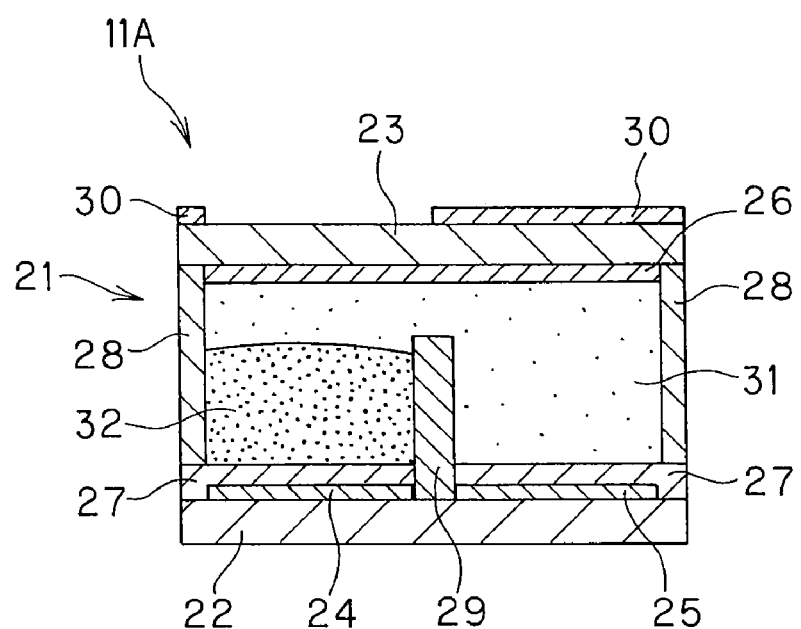
FIG. 5 is illustrative in section of yet another embodiment of the display system according to the invention.

Alternatively, use could be made of a structure wherein the intermediate partition 29 is directly formed on the substrate 22, as shown in FIG. 5.

The display cell forming the display system of the invention is not always limited to such structure as to provide displays of numeric information of "0" to "9" or the like as shown in FIG. 1. For instance, when the display cell operates in a reflection mode, a plurality of display cells, each using the oil colored in any one of yellow, magenta and cyan as the second liquid, could be arrayed in a matrix or other form for reflection-mode full-color displays. On the other hand, when the display cell works in a transmission mode with a colored liquid as the first liquid 31 and a light blocking black oil as the second liquid 32, a plurality of display cells, each using any one of red, green and blue liquids as the aforesaid colored liquid 31, could be arrayed in a matrix or other form for transmission-mode full-color displays.

A plurality of unit cells, each having the $1^{st}$-A electrode 24 and the $1^{st}$-B electrode 25 in the same location and configuration, could be arrayed in a matrix or other form, whereby consistent display performance could be achieved throughout the display system even in the absence of, for instance, the light block film 30.

[SECOND EMBODIMENT]

Figure 6:
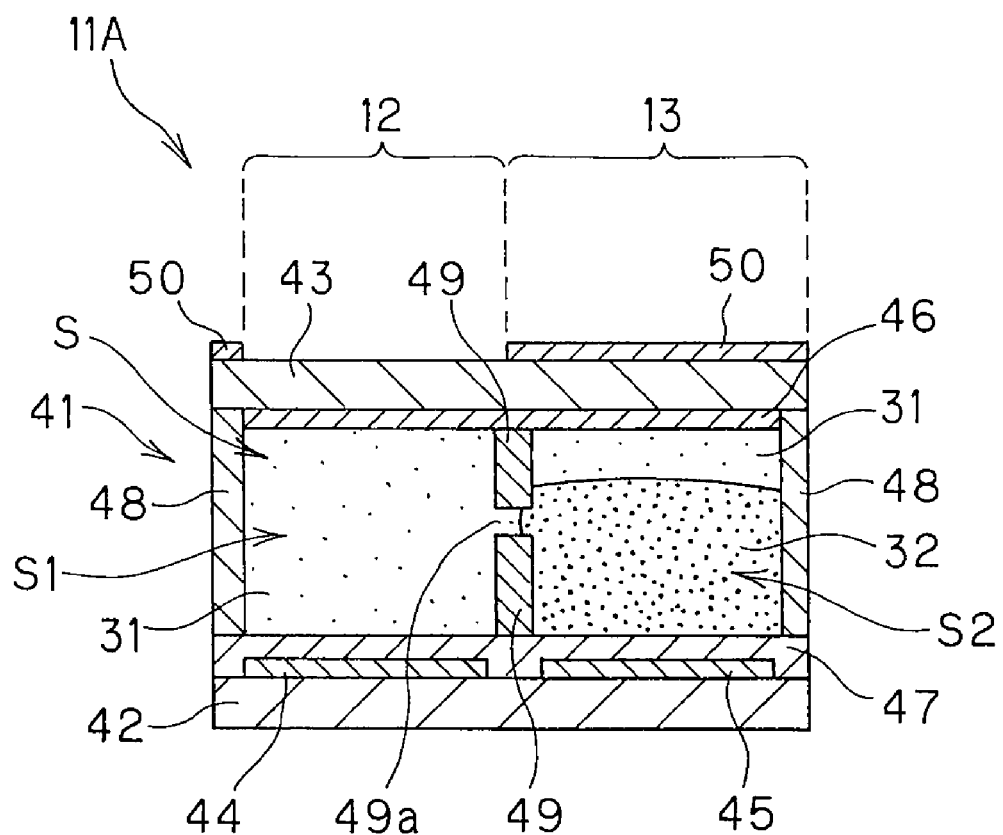
FIG. 6 is illustrative in longitudinal section, as in FIG. 2, of a further embodiment of the display system according to the invention.

FIG. 6 is illustrative, as in FIG. 2, of the second embodiment of the display system according to the invention, and indicative of the structure of one display cell. According to the embodiment of FIG. 6, in an assembly 41 of a display cell 11A, there are an electrically conductive or polar, first liquid 31 and a hydrophobic, second liquid 32 filled.

The assembly 41 comprises a set of substrates 42 and 43 and a wall portion 48 for supporting them in opposition to one another to define a liquid confining space S. On a side that faces the liquid confining space S, one substrate 42 comprises a $1^{st}$-A electrode 44 and a $1^{st}$-B electrode 45 which are located in a mutually electrically independent way, and an insulating layer 47 that provides a cover for them. On that insulating layer 47, there is an intermediate partition 49 positioned at a boundary site between the $1^{st}$-A electrode 44 and the $1^{st}$-B electrode 45 in such a way as to divide the liquid confining space S. Another substrate 43 comprises a second electrode 46 on the side that faces the liquid confining space S, and another end of the aforesaid intermediate partition 49 is joined to the substrate 43. The aforesaid intermediate partition 49 has an opening 49a that provides a liquid flow path. The side of the assembly 41 that faces the substrate 43 is a display viewing side, and at least the substrate 43 is transparent. On the outside of the substrate 43, there is a light block film 50 located, a site with no light block film 50 found defining a pixel segment 12 and a site with the light block film 50 found defining a space segment 13.

In the aforesaid display cell 11A, the $1^{st}$-A electrode 44 and the $1^{st}$-B electrode 45 are electrically insulated by the insulating layer 47 from the first liquid 31 and the second liquid 32. And the invention is characterized in that between a angle θ1 of contact with water droplets—indicative of hydrophilicity—of a site of the wall portion 48 exposed in the assembly 41, an angle θ2 of contact with water droplets—indicative of the hydrophilicity—of the intermediate partition 49 and an angle θ3 of contact with water droplets—indicative of hydrophilicity—of the insulating layer 47, there is a specific relation θ1<θ2≦θ3 that makes sure such memory capability as described below.

Figure 7A:
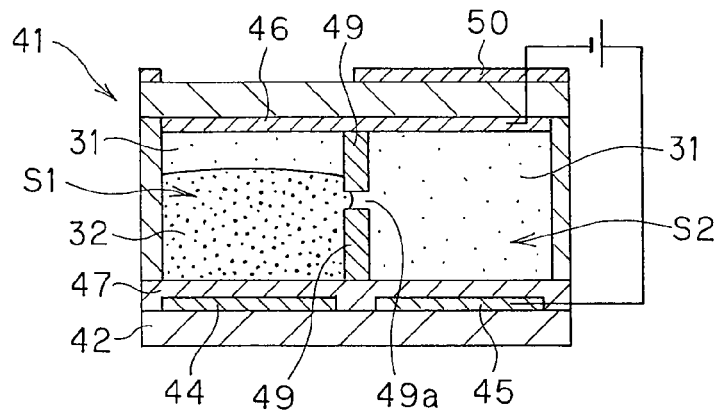
FIGS. 7A, 7B, 7C and 7D are illustrative of the operation of the display system according to the invention.
Figure 7B:
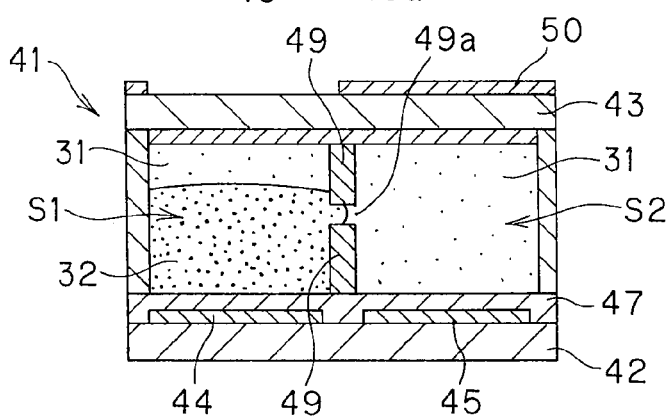
Figure 7C:
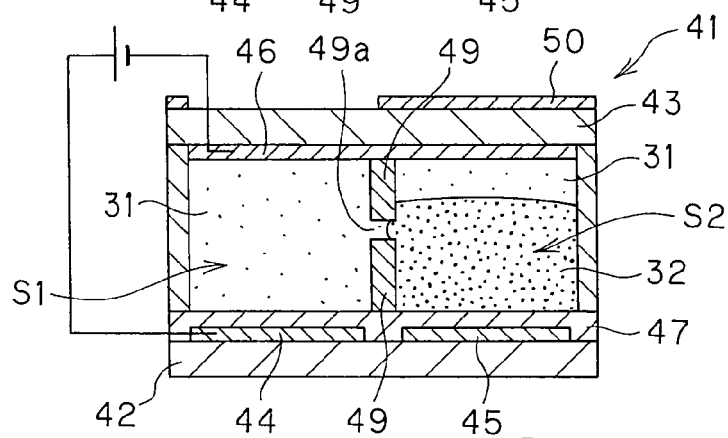
Figure 7D:
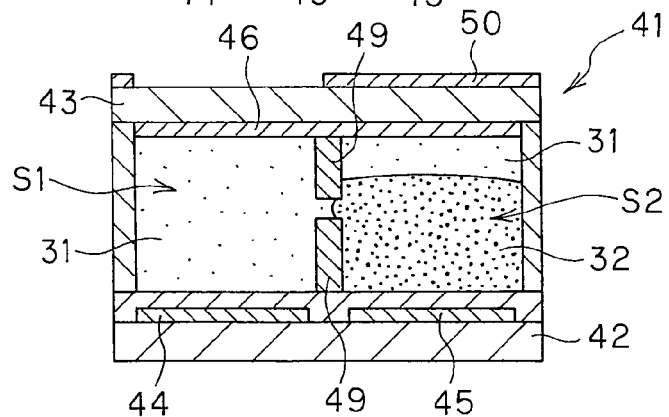

In such display cell 11A, as voltage is applied between the $1^{st}$-B electrode 45 and the second electrode 46, the second liquid 32 goes through the opening 49a in the intermediate partition 49, migrating into a liquid confining space S1 on the $1^{st}$-A electrode 44, as shown in FIG. 7A. In this state, as the applied voltage is shut off, the intermediate partition 49 works as a liquid retainer means, so that the second liquid 32 that has migrated into the liquid confining space S1 on the $1^{st}$-A electrode 44 is retained intact, producing memory capability (FIG. 7B). As voltage is applied between the $1^{st}$-A electrode 44 and the second electrode 46, the second liquid 32 goes through the opening 49a in the partition 49, migrating into a liquid confining space S2 on the $1^{st}$-B electrode 45 (FIG. 7C). In this state, as the applied voltage is shut off, the intermediate partition 49 works as a liquid retainer means, so that the second liquid 32 that has migrated into the liquid confining space S2 on the $1^{st}$-B electrode 45 is retained intact, producing memory capability (FIG. 7D). Such display cell 11A is capable of producing on/off displays depending on whether or not there is the second liquid 32 positioned on the electrode surface (the $1^{st}$-A electrode 44) of the site with no light block film 50 found (the pixel segment 12).

It is here appreciated that the area and configuration of the $1^{st}$-A electrode 44 and the $1^{st}$-B electrode 45, and the volume and configuration of the liquid confining space S1 on the $1^{st}$-A electrode 44 and the liquid confining space S2 on the $1^{st}$-B electrode 45 may be identical or different.

Figure 8A:
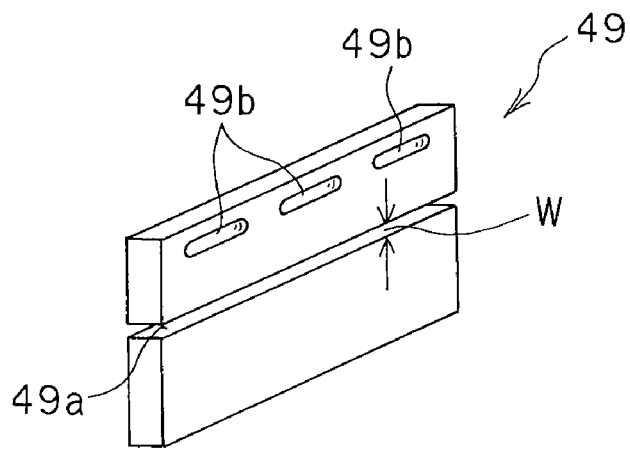
FIGS. 8A, 8B and 8C are illustrative in perspective of examples of the intermediate partition that forms a part of the display system according to the invention.
Figure 8B:
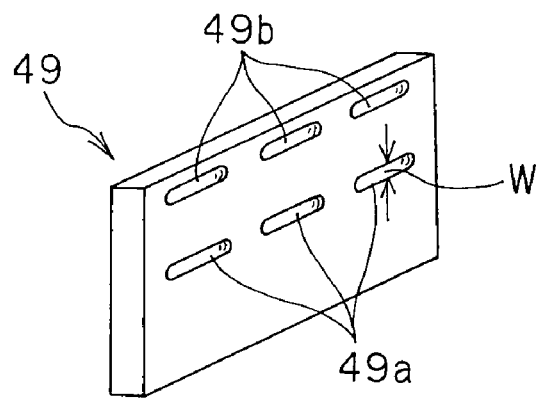
Figure 8C:
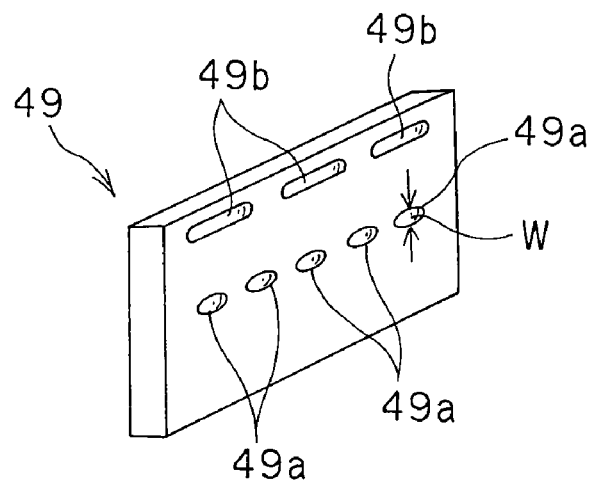

The intermediate partition 49 that forms a part of the display cell 11A is the liquid retainer means, and there is no particular limitation on the opening 49a that provides a liquid flow path; for instance, that opening could be such a slit-form opening as depicted in FIG. 8A, multiple such elliptic openings as depicted in FIG. 8B, and multiple such oval openings as depicted in FIG. 8C. However, it is desired that the width W of the opening 49a be in the range of 1 to 1,000 μm, and preferably 1 to 100 μm. As the opening width W is less than 1 μm, there is an increased resistance with which the second liquid 32 passes through the opening 49a, and at greater than 1,000 μm, the intermediate partition 49 often loses its own liquid retainer function.

Referring to FIGS. 8A, 8B and 8C, it is noted that apart from the opening 49a, the intermediate partition 49 is provided with an opening 49b that makes it easy for the first liquid 31 to go through the partition 49 in a direction opposite to that of the second liquid. When such opening 49b is in contact with the level of the second liquid 32 while the intermediate partition 49 functions as the liquid retainer means, it is desired that the opening width W be in the range of 1 to 1,000 μm, and preferably 1 to 100 μm, as is the case with the aforesaid opening 49a. However, there is no limitation on how many openings 49b are used, and what configuration they are used in. The total area of the opening 49a in the intermediate partition 49 could be optionally determined while taking the flowability, etc. of the first and second liquids 31 and 32 used into account.

The assembly 41 comprising such intermediate partition 49, especially the one having such slit-form opening 49a as depicted in FIG. 8A, could be formed by providing the substrates 42 and 43 with partition members, then forming the opening 49b through the partition member on the side of the substrate 43 by means of laser processing, machining or the like, and finally positioning the substrates 42 and 43 in such a way as to arrange the ends of the partition members in opposition to one another via a desired gap (the opening 49a). In this case, the formation of the partition members to the substrates 42 and 43 could be achieved as is the case with the aforesaid intermediate wall 29. The assembly 41 having the intermediate partition 49 configured as in FIG. 8B or 8C could be formed by forming the intermediate partition 49 on one substrate as is the case with the above intermediate partition 29, then forming the opening 49a, 49b by means of laser processing, machining or the like, and finally engaging the end of the intermediate partition 49 with another substrate, thereby supporting the substrates 42 and 43 in opposition to one another. The intermediate partition 49, for instance, could be formed of a material selected from the materials for the aforesaid intermediate partition 29.

The substrates 42, 43, the 1$^{st}$-A electrode 44, the 1$^{st}$-B electrode 45 and the second electrode 46 forming the display cell 11A could be similar to the substrates 22, 23, the 1$^{st}$-A electrode 24, the 1$^{st}$-B electrode 25 and the second electrode 26 in the foregoing embodiment: their explanation is left out.

The insulating layer 47, the wall portion 48 and the light block film 50 forming the display cell 11A, too, could be similar to the insulating layer 27, the wall portion 28 and the light block film 30 in the foregoing embodiment: their explanation is here left out.

The first liquid 31 to be filled in the assembly 41 could be similar to the first liquid 31 to be filled in the assembly 21 in the foregoing embodiment.

On the other hand, the second liquid 32 to be filled in the assembly 41 could be similar to the second liquid 32 to be filled in the assembly 21 in the foregoing embodiment, and for that, use could be made of oils such as dodecane, hexadecane, octadecane and tetradecane, each having a surface tension at 20° C. of 10 to 73 dyne/cm, and preferably 15 to 70 dyne/cm. The use of such oil ensures that the intermediate partition 49 functions more as the liquid retainer means. The "surface tension" here is worked out from a measurement obtained by measuring the angle of contact of a droplet added down on a solid with a contact angle meter. It is here preferable that between the specific gravity g1 of the first liquid 31 and the specific gravity g2 of the second liquid 32, there is a specific relation: g$1 \leq$ g$2$.

In the invention, the second liquid 32 could be colored oil whereby information or the like could be displayed in any desired color.

When the display cell 11A operates in a transmission mode, the first liquid 31 could be a colored liquid while the second liquid 32 is a black oil having light block capability, whereby on/off displays could be generated in two colors, a color transmitting through the colored liquid 31 and black.

The display cell 11A is not always limited to the aforesaid structure. The display cell 11A could have a structure wherein its side facing the substrate 42 is a display viewing side and the light block film 50 is provided on the outside of the substrate 42. In this case, the substrate 42 is transparent, and so are the 1$^{st}$-A electrode 44, the 1$^{st}$-B electrode 45 and the insulating layer 47. With the display cell 11A working in a transmission mode, the substrate 43 and the second electrode 46 are transparent, too. With no light block film 50 provided, displays could be generated by virtue of displacements of the first and second liquid 31 and 32 due to their movement. Alternatively, use could be made of a structure wherein the intermediate partition 49 is directly formed on the substrate 42.

The display cell forming the display system of the invention is not always limited to such structure as to provide displays of numeric information of "0" to "9" or the like as shown in FIG. 1. For instance, when the display cell operates in a reflection mode, a plurality of display cells, each using the oil colored in any one of yellow, magenta and cyan as the second liquid, could be arrayed in a matrix or other form for reflection-mode full-color displays. On the other hand, when the display cell works on a transmission mode with a colored liquid as the first liquid 31 and a light block black oil as the second liquid 32, a plurality of display cells, each using any one of red, green and blue liquids as the aforesaid colored liquid 31, could be arrayed in a matrix or other form for transmission-mode full-color displays for transmission-mode full-color displays.

A plurality of unit cells, each having the 1$^{st}$-A electrode 44 and the 1$^{st}$-B electrode 45 in the same location and configuration, could be arrayed in a matrix or other form, whereby consistent display performance could be achieved throughout the display system even in the absence of, for instance, the light block film 50.

[THIRD EMBODIMENT]

Figure 9:
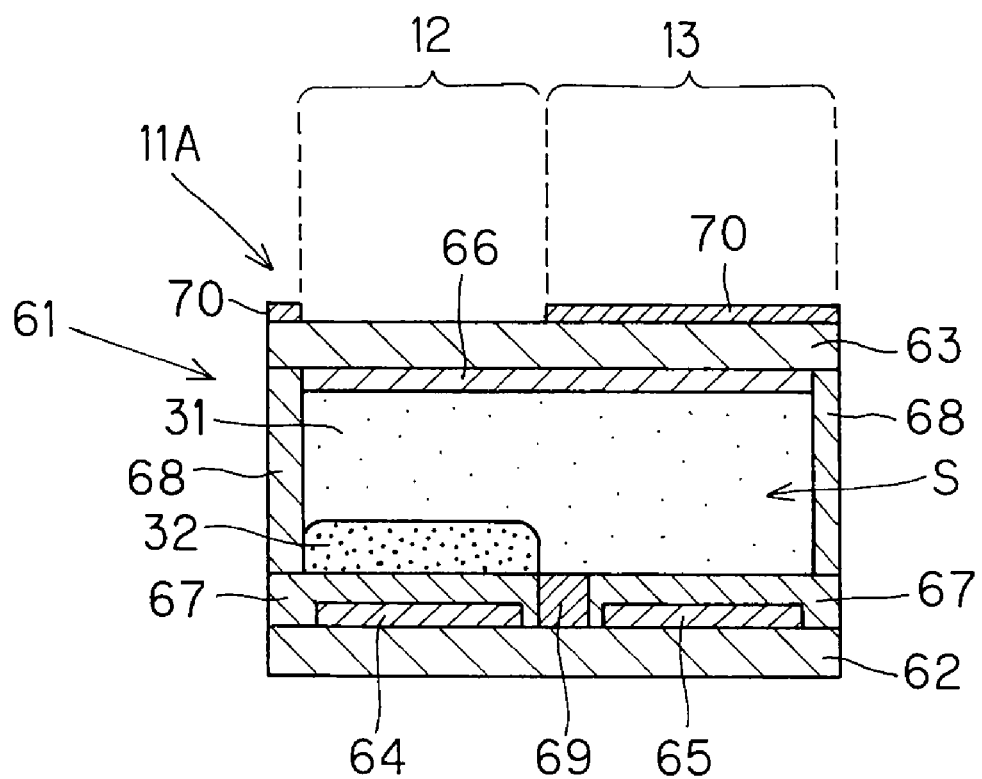
FIG. 9 is illustrative in longitudinal section, as in FIG. 2, of a further embodiment of the display system according to the invention.

FIG. 9 is illustrative, as in FIG. 2, of the third embodiment of the display system according to the invention, and indicative of the structure of one display cell. According to the embodiment of FIG. 9, in an assembly 61 of a display cell 11A, there are an electrically conductive or polar, first liquid 31 and a hydrophobic, second liquid 32 filled.

The assembly 61 comprises a set of substrates 62 and 63 and a wall portion 68 for supporting them in opposition to one another to define a liquid confining space S. On a side that faces the liquid confining space S, one substrate 62 comprises a 1$^{st}$-A electrode 64 and a 1$^{st}$-B electrode 65 located in a mutually electrically independent way, and an insulating layer 67 that provides a cover for them. Further, there is a memory layer 69 located and positioned at a boundary site between the 1$^{st}$-A electrode 64 and the 1$^{st}$-B electrode 65. Another substrate 63 comprises a second electrode 66. The side of the assembly 61 that faces the substrate 63 is a display viewing side, and at least the substrate 63 is transparent. On the outside of the substrate 63, there is a light block film 70 located, a site with no light block film 70 found defining a pixel segment 12 and a site with the light block film 70 found defining a space segment 13.

In the aforesaid display cell 11A, the 1$^{st}$-A electrode 64 and the 1$^{st}$-B electrode 65 are electrically insulated by an insulating layer 67 from the first liquid 31 and the second liquid 32. And the invention is characterized in that between an angle θ1 of contact with water droplets—indicative of hydrophilicity—of a site of the wall portion 68 exposed in the assembly 61, an angle θ2 of contact with water droplets—indicative of hydrophilicity—of the memory layer 69 and an angle θ3 of contact with water droplets—indicative of hydrophilicity—of the insulating layer 67, there is a specific relation θ1<θ2<θ3 that makes sure such memory capability as described below.

Figure 10A:
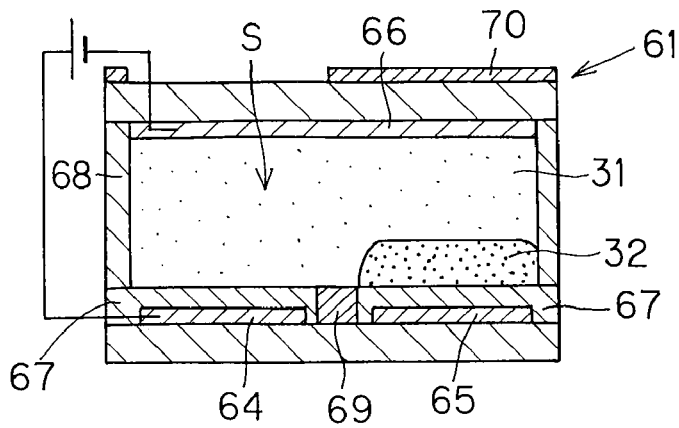
FIGS. 10A, 10B, 10C and 10D are illustrative of the operation of the display system according to the invention.
Figure 10B:
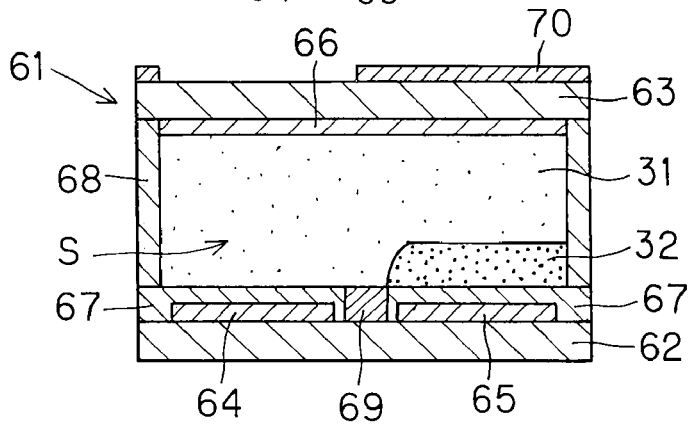
Figure 10C:
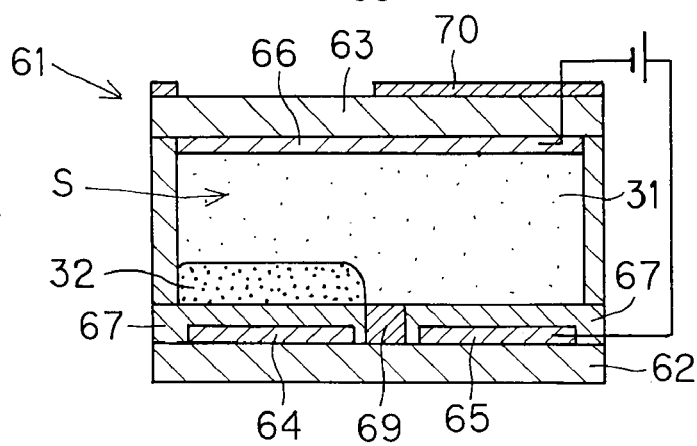
Figure 10D:
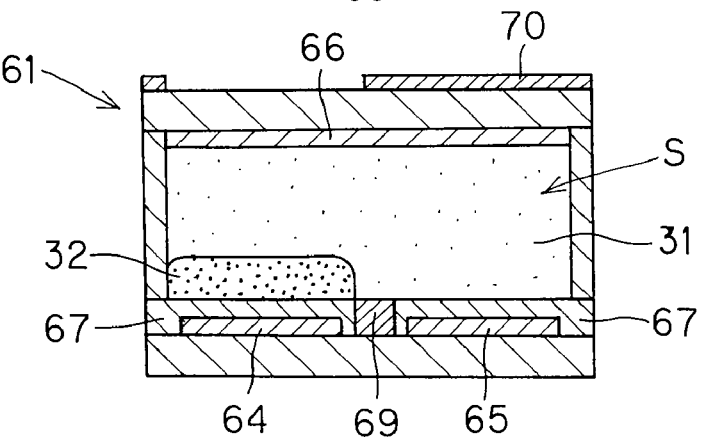

In such display cell 11A, as voltage is applied between the 1$^{st}$-A electrode 64 and the second electrode 66, the second liquid 32 goes over the memory layer 69, migrating onto the 1$^{st}$-B electrode 65 (the insulating layer 67), as shown in FIG. 10A. In this state, as the applied voltage is shut off, the memory layer 69 works as a liquid retainer means, so that the second liquid 32 that has migrated onto the 1$^{st}$-B electrode 65 is retained intact, producing memory capability (FIG. 10B). As voltage is applied between the 1$^{st}$-B electrode 65 and the second electrode 66, the second liquid 32 goes over the memory layer 69, migrating onto the 1$^{st}$-A electrode 64 (insulating layer 67)(FIG. 10C). In this state, as the applied voltage is shut off, the memory layer 69 works as a liquid retainer means, so that the second liquid 32 that has migrated onto the 1$^{st}$-A electrode 64 is retained intact, producing memory capability (FIG. 10D). In such display cell 11A, on/off displays are achievable depending on whether or not the second liquid 32 is positioned on the electrode surface (the 1$^{st}$-A electrode 64 in the embodiment illustrated) of the site (pixel segment 12) with no light block film 70 found.

It is here noted that the position of the memory layer 69 could be optionally determined with respect to the 1$^{st}$-A and 1$^{st}$-B electrodes 64 and 65, and the area and configuration of the 1$^{st}$-A and 1$^{st}$-B electrodes 64 and 65 may be identical or different.

Figure 11:
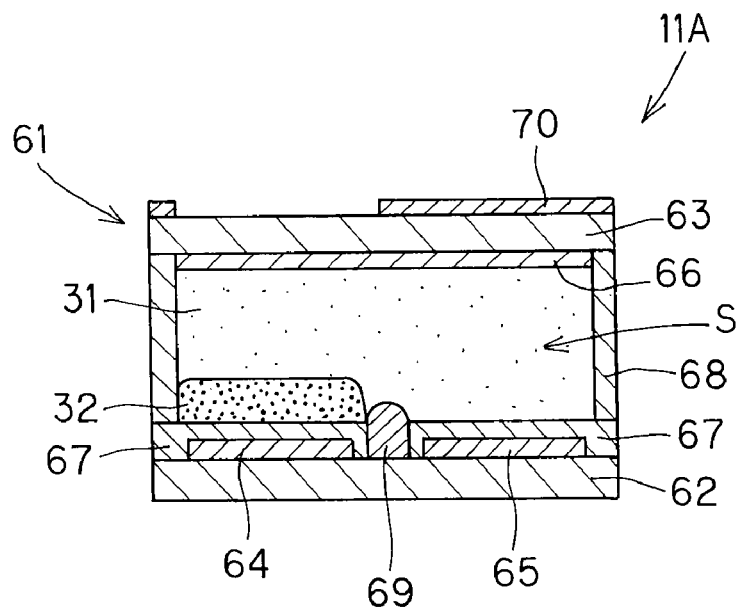
FIG. 11 is illustrative in longitudinal section, as in FIG. 2, of a further embodiment of the display system according to the invention.

The memory layer 69 that forms a part of the display cell 11A is a liquid retainer means, and could be formed of a material that satisfies the specific relation (θ1<θ2<θ3) about the aforesaid water droplet contact angle indicative of hydrophilicity. For instance, use could be made of fluororesins, and silicone resins. The memory layer 69 may also have electrical insulation. The memory layer 69 may have a thickness determined from the range of, for instance, 0.01 to 100 μm. The memory layer 69 may further be configured such that it juts out toward the liquid confining space S, as shown in FIG. 11.

The substrates 62, 63, the 1$^{st}$-A electrode 64, the 1$^{st}$-B electrode 65 and the second electrode 66 that form the display cell 11A could be similar to the substrates 22, 23, the 1$^{st}$-A electrode 24, the 1$^{st}$-B electrode 25 and the second electrode 26 in the foregoing embodiment: their explanation is here left out.

The insulating layer 67, wall portion 68 and light block film 70 that form the display cell 11A, too, may be such that there is the specific relation θ1<θ2<θ3 about the magnitude of the aforesaid water droplet contact angle, an index to hydrophilicity; they could be similar to the insulating layer 27, wall portion 28 and light block film 30 in the foregoing embodiment, and their explanation is here left out.

The first liquid 31 to be filled in the assembly 61 could be similar to the first liquid 31 to be filled in the assembly 21 in the foregoing embodiment.

On the other hand, the second liquid 32 to be filled in the assembly 61 could be similar to the second liquid 32 to be filled in the assembly 21 in the foregoing embodiment, and for that, use could be made of oils such as heptane, hexane, nonane, decane, octane, dodecane, tetradecane, octadecane, hexadecane, ethylene glycol monobutyl ether acetate, diethylene glycol monobutyl ether acetate, and ethyl benzoate, each having a surface tension at 20° C. of 10 to 73 dyne/cm, and preferably 15 to 70 dyne/cm, thereby ensuring that the memory layer 69 functions more as a liquid retainer means. It is here preferable that between the specific gravity g1 of the first liquid 31 and the specific gravity g2 of the second liquid 32, there is a specific relation: $g1 \leq g2$.

In the invention, the second liquid 32 could be colored oil whereby information or the like could be displayed in any desired color.

When the display cell 11A operates in a transmission mode, the first liquid 31 could be a colored liquid while the second liquid 32 is a black oil having light block capability, whereby on/off displays could be generated in two colors, a color transmitting through the colored liquid 31 and black.

The display cell 11A is not always limited to the above structure. As shown typically in FIG. 12, the insulating layer 67 may have a covering layer 67' on it, and the memory layer 69 is positioned at a site between the 1$^{st}$-A electrode 64 and the 1$^{st}$-B electrode 64 and on a portion of the insulating layer 67 with none of the covering layer 67' formed. In this case, the water droplet contact angle θ3', an index to the hydrophilicity of the covering layer 67' should be greater than the water droplet contact angle θ2, an index to the hydrophilicity of the memory layer 69.

The aforesaid covering layer 67' may be formed of such a material as to satisfy the magnitude of the water droplet contact angle (θ1<θ2<θ3'), the aforesaid index to hydrophilicity. For instance, it may be formed of a silane coupling agent material such as fluoroalkylsilane, and alkylsilane. If such a material is used to form a layer to cover the insulating layer 67 and only the site to be provided with the memory layer 69 is subjected to pattern exposure to form the memory layer 69, then a non-exposure site is turned into the covering layer 67'. In this case, pattern exposure may be implemented by way of a photo-catalyst such as titanium oxide, zinc oxide, and tin oxide. Such pattern exposure ensures that the memory layer 69 and the covering layer 67' can be formed in a high-definition pattern. The covering layer 67' may have a thickness in the range of, for instance, 0.01 to 100 μm. Note here that the material forming the covering layer 67' positioned on the 1$^{st}$-A electrode 64 may be identical with, or different from, the material forming the covering layer 67' positioned on the 1$^{st}$-B electrode 65. For instance, the water droplet contact angle indicative of the hydrophilicity of the covering layer 67' positioned on the 1$^{st}$-A electrode 64 may be smaller than that indicative of the hydrophilicity of the covering layer 67' positioned on the 1$^{st}$-B electrode 65.

The display cell 11A may have a structure wherein, for instance, the substrate 62 side defines a display viewing side, and the light block film 70 is formed on the outside of the substrate 62. In this case, the substrate 62 is transparent, and so are the 1$^{st}$-A electrode 64, the 1$^{st}$-B electrode 65 and the insulating layer 67, too. In the embodiment shown in FIG. 12, the covering layer 67' is transparent, too. In a transmission mode, the substrate 63 and the second electrode 66 are made transparent, too.

It is also possible to dispense with the light block film 70; displays are achievable by changes in the positions of the first liquid 31 and the second liquid 32 due to movement.

The display cell forming the display system of the invention is not always limited to such structure as to provide displays of numeric information of "0" to "9" or the like as shown in FIG. 1. For instance, when the display cell operates in a reflection mode, a plurality of display cells, each using the oil colored in any one of yellow, magenta and cyan as the second liquid, could be arrayed in a matrix or other form for reflection-mode full-color displays. On the other hand, when the display cell works on a transmission mode with a colored liquid as the first liquid 31 and a light block black oil as the second liquid 32, a plurality of display cells, each using any one of red, green and blue liquids as the above colored liquid 31, could be arrayed in a matrix or other form for transmission-mode full-color displays for transmission-mode full-color displays.

A plurality of unit cells, each having the 1$^{st}$-A electrode 64 and the 1$^{st}$-B electrode 65 in the same location and configuration, could be arrayed in a matrix or other form, whereby consistent display performance could be achieved throughout the display system even in the absence of, for instance, the light block film 70.

[Display Medium]

The display medium of the invention comprises one or more such display systems as described above, and has an input terminal adapted to feed power and signals from external equipment to each display cell in the display system, at which input terminal the display medium can be connected to or disconnected from the external equipment. This ensures that even after there is the display medium removed from the external equipment, it is possible to retain memory capability enough to carry information around with the display medium alone.

Figure 13:
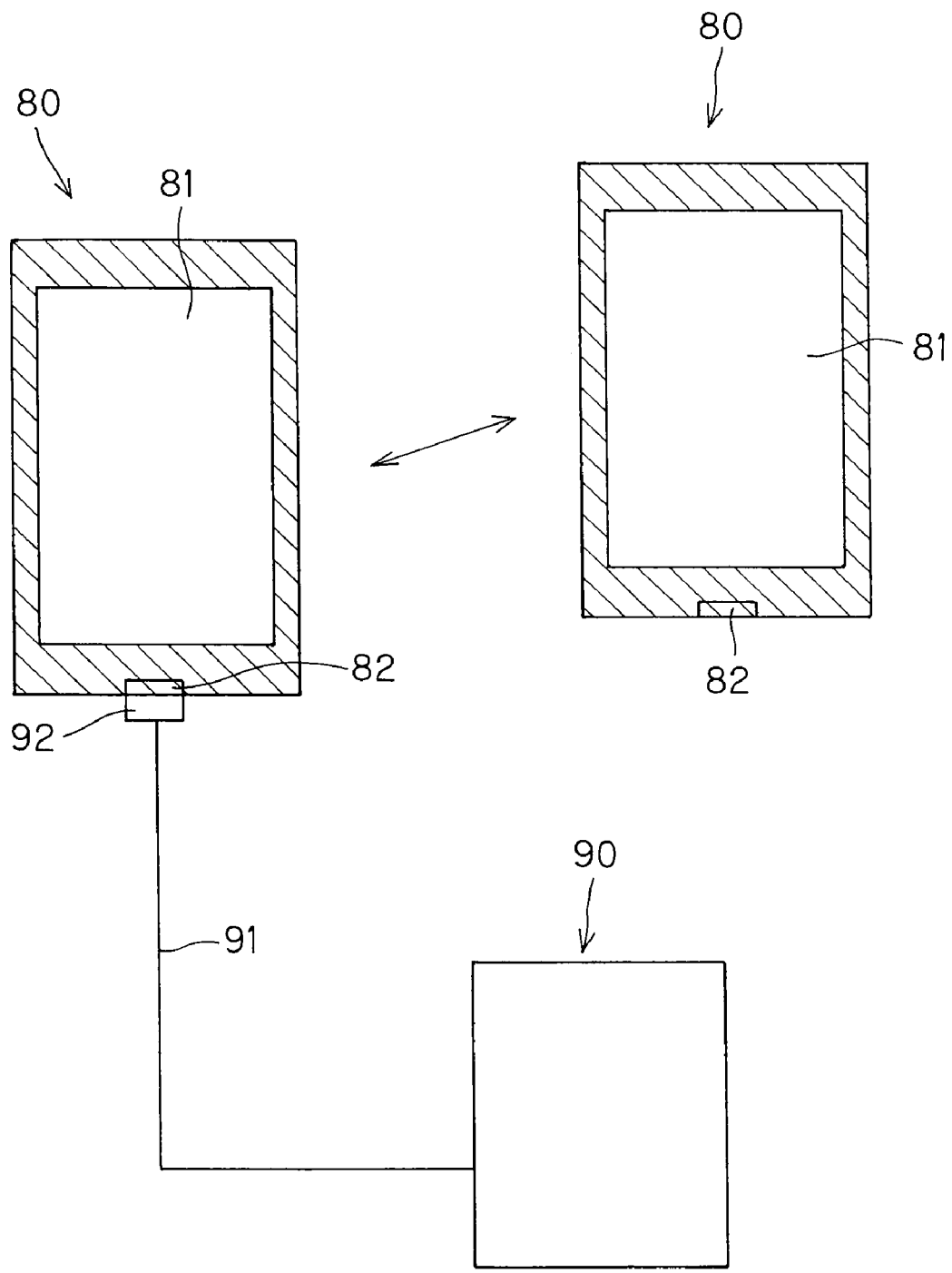
FIG. 13 is illustrative of one embodiment of the display medium according to the invention.

FIG. 13 is illustrative of one example of the display medium according to the invention. In FIG. 13, the inventive display medium 80 is built up of a display unit 81 comprising a set of multiple display systems according to the invention and an input terminal 82. There is no limitation on the number of display systems that build up the display unit 81 in the display medium 80, and as long as there is the input terminal 82 somewhere around the display unit 81 (a hatched site in FIG. 13), there is no limitation on where to locate it. The input terminal 82 is provided to feed power and signals from external equipment 90 to each display cell in the display system, and a connector 92 of transmission means 91 linked to the external equipment 90 is connected to it. At that input terminal 82, the display medium 80 is connectable to or detachable from the external equipment 90. Thus, the desired information can be displayed on the display medium 80 upon receipt of power and signals from the external equipment 90 by way of the input terminal 82, and thereafter, if the connector 92 is removed out of the input terminal 82 for disconnection of the display medium 80 from the external equipment 90, then the display medium 80 can be carried around at one's disposal.

The external equipment 90, for instance, includes computer means such as a personal computer and a mainframe computer, telefacsimile machines, copiers, data communications systems and processors for wireless communications, etc., network terminals, and the Internet terminals.

Not exclusively, the transmission means 91 could be those capable of feeding power and signals, for instance, electric conductor cables, and hardwire links.

The aforesaid embodiments of the invention are provided for the purpose of illustration alone; the invention is never limited to them.

The present invention is now explained in further details with respect to more specific examples.

EXAMPLE 1

First, on a 700 μm thick glass substrate (7059 glass made by Coning Co., Ltd.), a rectangular area (of 20 mm×10 mm size) was set for building up a display system comprising seven display cells, as shown in FIG. 14A, and sub-areas were set for the seven display cells. A pixel segment of each display cell was set to a 6 mm×1.5 mm rectangle (a hatched site in FIG. 14A).

Further, an area for the formation of the $1^{st}$-A electrode (a hatched site in FIG. 14B) was set in such a way as to include the above pixel segment, and an area (a hatched site in FIG. 14C) for the formation of the $1^{st}$-B electrode) was set.

Then, a Cr film (of 1,500 Å in thickness) was formed on the glass substrate by means of vapor deposition, and a photosensitive resist (MicroPosit made by Sipray Co., Ltd.) was applied on that Cr film at a thickness of 0.8 μm by means of spin coating, then prebaked at 90° C. for 3 minutes, then exposed to light in a given pattern (100 mJ/cm$^2$), then subjected to spray development using a 0.05% KOH aqueous solution for 60 seconds, and finally post-baked at 200° C. for 30 minutes to form a resist film. Then, using that resist film as a mask, the Cr film was etched (with an etching solution: a mixed solution of sulfuric acid and hydrogen peroxide) to form the $1^{st}$-A electrode and the $1^{st}$-B electrode for each display cell. Note here that wirings (not shown in FIG. 14) for the connection of the $1^{st}$-A and $1^{st}$-B electrodes to an external voltage application unit, too, were simultaneously formed.

Then, a photo-curing type resin composition (Optomer NN Series made by JCR Co., Ltd.) was coated by means of spin coating, then prebaked at 90° C. for 3 minutes, then exposed to light in a given pattern (100 mJ/cm$^2$), then subjected to spray development using 0.05% KOH aqueous solution for 60 seconds, and finally post-baked at 200° C. for 30 minutes to form an intermediate partition (100 μm in width and 10 μm in height) of such shape as indicated by a bold line in FIG. 14D. The angle of contact of that intermediate partition with water droplets, an index to hydrophilicity, was about 80°. Note here that the contact angle was measured by the θ/2 method on a contact angle measuring machine (CA-Z made by Kyowa Interface Chemical Co., Ltd.) after the lapse of 10 seconds from the time when (a given amount of) one droplet of pure water (distilled water for liquid chromatography made by Junsei Chemical Co., Ltd.) was added down to the surface of the object to be measured. The same was carried out in the inventive and comparative examples given later.

Then, an insulative resin (noncrystalline fluororesin Teflon AF1601S made by Mitsui-DuPont Fluorochemical Co., Ltd.) was coated on the glass substrate by means of screen printing in such a way as to cover the $1^{st}$-A and $1^{st}$-B electrodes, and heated at 100° C. for 10 minutes in an oven to form a 0.8 μm thick insulating layer. The water droplet contact angle of this insulating layer, an index to hydrophilicity, was about 115°.

Then, a bead-containing ultraviolet curable type resin (LCB-610 made by E.H.C.) was used to form a 1 mm wide, 200 μm high wall portion on the boundary lines between the display cells and on the outer periphery edge of the display system-formation rectangular area.

On another glass substrate (7059 glass made by Coning Co., Ltd.) of 700 μm in thickness, on the other hand, a display system-formation rectangular area and a pixel segment of each display cell were set, as described just above. On one surface of the glass substrate, an indium tin oxide (ITO) film was formed by means of vapor deposition in such a way as to be in alignment with the display system-formation rectangular area to form a second electrode (common electrode). Note here that wirings (not shown) for the connection of the second electrode to an external voltage application unit, too, were simultaneously formed.

Then, on another surface of that glass substrate, a light blocking resin material having the following composition was applied at a thickness of 5 μm by spin coating, then prebaked at 90° C. for 3 minutes, then exposed to light in a given pattern (100 mJ/cm$^2$), then subjected to spray development using a 0.05% KOH aqueous solution for 60 seconds, and finally post-baked at 200° C. for 30 minutes to form a light block film. This light block film was provided such that it was opposed to the second electrode by way of the glass substrate and seven pixel segments were bared out.

| (Light Blocking Resin Composition) | |
|---|---|
| Black pigment (TM Black #9550 made by Dainichi Seika Kogyo Co., Ltd.) | 14 parts by weight |
| Dispersant (Dispersbyklll made by Bic-Chemie) | 1.2 parts by weight |
| Polymer (VR60 made by Showa Polymer Co., Ltd.) | 2.8 parts by weight |
| Monomer (SR399 made by Sahtomer Co., Ltd.) | 3.5 parts by weight |
| Initiator (2-Bynzyl-2-dimethylamino-1-(4-morpholinophenyl)-butane-1 | 1.6 parts by weight |
| Initiator (4,4'-Diethylaminobenzophenone) | 0.3 part by weight |
| Initiator (2,4-Diethylthioxanthone) | 0.1 part by weight |
| Solvent | 75.8 parts by weight |

(Ethylene Glycol Monobutyl Ether)

Then, the surface of the glass substrate having the second electrode on it was engaged with and compressed against the wall portion of the glass substrate having the aforesaid intermediate partition, etc. on it, after which the wall portion was irradiated with ultraviolet radiation (60 mW/cm$^2$, five minutes) for curing. For that compression, first, water and oil (dodecane dyed with a blue dye (Oil Blue 5502 made by Arimoto Chemical Industries, Ltd.) were filled at a volumetric ratio of 50:1 in each display cell on the glass substrate having the intermediate partition, etc. on it, followed by alignment of the display cells on the two glass substrates. The angle of contact of the post-cured wall portion with water droplets, an index to hydrophilicity, was about 55°.

In this way such an inventive display system as shown in FIG. 2 was fabricated. In this display system, the water droplet contact angles of the wall portion, the intermediate partition, and the insulating layer, an index to hydrophilicity, were about 55°, about 80°, and about 115°, respectively, as described above.

As a dc voltage of 40 V was applied between all the $1^{st}$-A electrodes and the second electrode (common electrode) in all the display cells of the fabricated display system, it caused the oil (colored dodecane) to go over the intermediate partition, migrating into the space (space segment) on the $1^{st}$-B electrodes. As a result, extraneous light was reflected at the $1^{st}$-A electrode-formation Cr film at all the seven pixel segments, so that a figure "8" could be viewed from the side of the glass substrate having the light block film on it. As the applied voltage was shut off in this state, the same display state could be kept for 10 days or longer, indicating that there was an excellent memory capability achieved.

As a dc voltage of 40 V was applied between all the $1^{st}$-B electrodes and the second electrode (common electrode), it caused the oil (colored dodecane) to go over the intermediate partition, migrating into the spaces (pixel segments) on the $1^{st}$-A electrodes, so that the blue of the oil (colored dodecane) could be viewed and the figure "8" could be displayed. As the applied voltage was shut off in this state, the same display state could be kept for 10 days or longer, indicating that there was an excellent memory capability achieved.

By the optional determination of the $1^{st}$-A or the $1^{st}$-B electrodes to which direct-current voltage was applied at the second electrode (common electrode), any desired figure of "0" to "9" could be displayed by reflected light or the blue of the oil (colored dodecane). In this case, too, there was an excellent memory capability achieved.

EXAMPLE 2

As in Example 1, the $1^{st}$-A and $1^{st}$-B electrodes were formed on a 200 μm thick PET film for each display cell, and an insulating layer was provided in such a way as to cover the $1^{st}$-A and $1^{st}$-B electrodes. The water droplet contact angle of this insulating layer, an index to hydrophilicity, was about 115°.

On the other hand, the second electrode (common electrode) was formed on another PET film of 200 μm in thickness as in Example 1, and a light block film was formed on another surface of that PET film as in Example 1.

Then, the 2P technique was used with an acrylic resin (Seika Beam Series made by Dainichi Seika Kogyo Co., Ltd.) to form an intermediate partition (of 100 Mm in width and 100 μm in height) on the insulating layer on the PET film having the above $1^{st}$-A and $1^{st}$-B electrodes, and on the second electrode on the PET film with that second electrode at positions indicated by bold lines in FIG. 14D. The intermediate partitions were formed by lamination under the application of heat of 100° C. using a laminator, exposure to light in a given pattern (500 mJ/cm$^2$), spray development using a 0.05% KOH aqueous solution for 60 seconds, and post-baking at 160° C. for 30 minutes, and the remnants of resin other than the intermediate partitions were etched off by means of ordinary drying etching. The intermediate partition patterns formed on both PET films were symmetric about plane. Each intermediate partition had on its upper end side 30 semicircular cutouts of 10 μm in radius at a 0.2 mm pitch. Then, 30 circular openings of 10 μm in radius were arrayed at a 0.2 mm pitch at a position 50 μm away from the upper end side of the intermediate partition formed on the PET film having the second electrode toward the PET film side by means of laser irradiation. The water droplet contact angle of this intermediate partition, an index to hydrophilicity, was about 65°.

As in Example 1, a 0.8 μm thick insulating layer was formed on the PET film in such a way as to cover the $1^{st}$-A and $1^{st}$-B electrodes. The water droplet contact angle of this insulating layer, an index to hydrophilicity, was about 115°.

Then, a dry film (FD-1000 made by Hitachi Kasei Co., Ltd.) was used with photolithography to form a 1 mm wide, 200 μm high wall portion on the boundary lines between the display cells, each having the $1^{st}$-A and $1^{st}$-B electrodes and on the outer periphery edge of the display system-formation rectangular area. The water droplet contact angle of this wall portion, an index to hydrophilicity, was about 60°. Further, an ultraviolet-curing type resin (LCB-610 made by E.H.C) was coated on the outer periphery of the wall portion on the outer periphery of the display system-formation rectangular area.

Then, water and oil (dodecane dyed with a blue dye (Oil Blue 5502 made by Arimoto Chemical Industries, Ltd.) were filled at a volumetric ratio of 50:1 in each display cell on the PET film having the wall portion formed, after which another PET film was engaged with and compressed against that wall portion. In this compressed state, the upper end sides of the intermediate partitions formed on the PET films were engaged together to form an intermediate partition for halving the liquid confining space in each cell, the semicircular cutouts were opposed to one another to from a circular opening. In this state, the ultraviolet-curing type resin was irradiated with ultraviolet radiation (60 mW/cm$^2$, 5 minutes) for curing.

In this way, there was such an inventive display system as shown in FIG. 6 fabricated, which had such an intermediate partition as shown in FIG. 8C. In this display system, the water droplet contact angles of the wall portion, the intermediate partition and the insulating layer, all an index to hydrophilicity, were about 60°, about 65° and about 115°, respectively, as described above.

As in Example 1, the display performance of the fabricated display system was estimated while the $1^{st}$-A and $1^{st}$-B electrodes to which direct-current voltage was applied at the second electrode (common electrode) were optionally selected. As a consequence, any desired figure of "0" to "9" could be displayed by reflected light or the blue of the oil (colored dodecyldecane). Even after the applied voltage was shut off, the same display state could be kept for 10 days or longer, indicating that there was an excellent memory capability achieved.

EXAMPLE 3

As in Example 1, the $1^{st}$-A and $1^{st}$-B electrodes were formed on a 700 μm thick glass substrate film for each display cell.

Then, a polyimide resin (AL1254 made by JSR Co., Ltd.) was printed by flexography on a site of the glass substrate with none of the $1^{st}$-A and $1^{st}$-B electrodes found, and fired at 230° C. for 60 minutes to form a memory layer of 0.8 μm in thickness. The water droplet contact angle of this memory layer, an index to hydrophilicity, was about 65°.

Then, an insulative resin (noncrystalline fluororesin Teflon AF1601S made by Mitsui-DuPont Fluorochemical Co., Ltd.)

was coated on the glass substrate by means of screen printing in such a way as to cover the $1^{st}$-A and $1^{st}$-B electrodes and bare out the aforesaid memory layer, and heated at 100° C. for 10 minutes in an oven to form a 0.8 μm thick insulating layer. The water droplet contact angle of this insulating layer, an index to hydrophilicity, was about 115°.

On the other hand, the second electrode (common electrode) was formed on another glass substrate (7059 glass made by Coning Co., Ltd.) of 700 μm in thickness as in Example 1, and a light block film was formed on another surface of that glass substrate as in Example 1.

Then, a 1 mm wide, 200 μm high wall portion was formed on the boundary lines between the display cells, each having the $1^{st}$-A and $1^{st}$-B electrodes and on the outer periphery edge of the display system-formation rectangular area.

Then, water and oil (dodecane dyed with a blue dye (Oil Blue 5502 made by Arimoto Chemical Industries, Ltd.) were filled at a volumetric ratio of 50:1 in each display cell on the glass substrate having the wall portion formed, after which another glass substrate having the second electrode was engaged with and compressed against that wall portion. In this state, the wall portion was irradiated with ultraviolet radiation (60 mW/cm², 5 minutes) for curing. The water droplet contact angle of this post-curing wall portion, an index to hydrophilicity, was about 55°.

In this way, there was such an inventive display system as shown in FIG. 9 fabricated. In this display system, the water droplet contact angles of the wall portion, the memory layer and the insulating layer, all an index to hydrophilicity, were about 55°, about 65° and about 115°, respectively, as described above.

As a dc voltage of 40 V was applied between all the $1^{st}$-A electrodes and the second electrode (common electrode) in all the display cells of the fabricated display system, it caused the oil (colored dodecane) to go over the memory layer, migrating into the space (space segment) on the $1^{st}$-B electrodes. As a result, extraneous light was reflected at the $1^{st}$-A electrode-formation Cr film at all the seven pixel segments, so that a figure "8" could be displayed. As the applied voltage was shut off in this state, the same display state could be kept for 10 days or longer, indicating that there was an excellent memory capability achieved.

As a dc voltage of 40 V was applied between all the $1^{st}$-B electrodes and the second electrode (common electrode), it caused the oil (colored dodecane) to go over the memory layer, migrating into the spaces (pixel segments) on the $1^{st}$-A electrodes, so that the blue of the oil (colored dodecane) could be viewed and the figure "8" could be displayed. As the applied voltage was shut off in this state, the same display state could be kept for 10 days or longer, indicating that there was an excellent memory capability achieved.

By the optional determination of the $1^{st}$-A or the $1^{st}$-B electrodes to which direct-current voltage was applied at the second electrode (common electrode), any desired figure of "0" to "9" could be displayed by reflected light or the blue of the oil (colored dodecane). In this case, too, there was an excellent memory capability achieved.

Comparative Example

Such a display system as depicted in FIG. 9 was fabricated as in Example 3 with the exception that the polyimide resin (AL1254 made by JSR Co., Ltd.) was used to from an insulating layer whose water droplet contact angle, an index to hydrophilicity, was about 65°, and the fluororesin ((noncrystalline fluororesin Teflon AF1601S made by Mitsui-DuPont Fluorochemical Co., Ltd.) was used to form a memory layer whose water droplet contact angle, an index to hydrophilicity, was about 115°. In this display system, the water droplet contact angles of the wall portion, the memory layer and the insulating layer, all an index to hydrophilicity, were about 55°, about 115° and about 65°, respectively.

The display performance of the fabricated display system was estimated with the optional determination of the $1^{st}$-A or $1^{st}$-B electrodes to which direct-current voltage was applied at the second electrode (common electrode) as in Example 3. As a result, the oil (colored dodecane) was likely to rest on the memory layer: it did not fully spread over the insulating layer, resulting in the inability of provide stable displays even at the application of voltage.

EXAMPLE 4

As in Example 1, the $1^{st}$-A and $1^{st}$-B electrodes were formed on a 700 μm thick glass substrate for each display cell, and a polyimide resin (AL1254 made by JSR Co., Ltd.) was printed by flexography in such a way as to cover the $1^{st}$-A and $1^{st}$-B electrodes, and fired at 230° C. for 60 minutes to an insulating layer of 0.8 μm in thickness.

Then, a 1% by weight isopropyl alcohol solution of a fluoroalkylsilane (a 1:5 mixture (by weight) of TSL8233 and YSL8114 made by GE Toshiba Silicone Co., Ltd.) was coated by spin coating in such a way as to cover the aforesaid insulating layer, thereby forming a coating film (of 0.07 μm in thickness).

On the other hand, a mask having a light-transmitting portion at a position with none of the $1^{st}$-A an $1^{st}$-B electrodes found was provided, and a photo-catalyst composition (a binder resin (TSL8223 made by Toshiba Silicone Co., Ltd.) with a photo-catalyst titanium oxide contained therein in an amount of 30% by weight) was spin coated on one side of that mask, and dried to form a catalyst layer of 0.1 μm in thickness.

While the aforesaid mask was opposed on its catalyst layer side to the aforesaid fluoroalkylsilane-coated surface, proximity exposure was carried out (using light having a wavelength of shorter than 380 nm (254 nm)). Consequently, in each display cell area, a coating layer (of 0.07 μm in thickness) was formed at a site corresponding to the $1^{st}$-A and $1^{st}$-B electrodes (a non-exposure site) and, in a site with none of the $1^{st}$-A and $1^{st}$-B electrodes found, the side chain of the fluoroalkylsilane-coated film was replaced by a hydroxyl group to form a hydrophilic memory layer (of 0.07 μm in thickness). The water droplet contact angles of the thus formed coating layer and the memory layer, an index to hydrophilicity, were about 113° and about 80°, respectively.

On the other hand, the second electrode (common electrode) was formed on another glass substrate (7059 glass made by Coning Co., Ltd.) of 700 μm in thickness as in Example 1, and a light block layer was formed on another surface of that glass substrate as in Example 1.

Then, a 1 μm wide, 200 μm high wall portion was formed on the boundary line of each display cell on the glass substrate having the $1^{st}$-A and $1^{st}$-B electrodes, and on the outer periphery edge of the display system-formation rectangular area, as in Example 1.

Then, water and oil (dodecane dyed with a blue dye (Oil Blue 5502 made by Arimoto Chemical Industries, Ltd.) were filled at a volumetric ratio of 50:1 in each display cell on the glass substrate having the wall portion on it, after which the PET film having the wall portion was engaged with and compressed against that wall portion. And then, the wall portion was irradiated with ultraviolet radiation (60 mW/cm², 5 minutes) for curing. The water droplet contact angle of the post-curing wall portion, an index to hydrophilicity, was about 55°.

Figure 12:
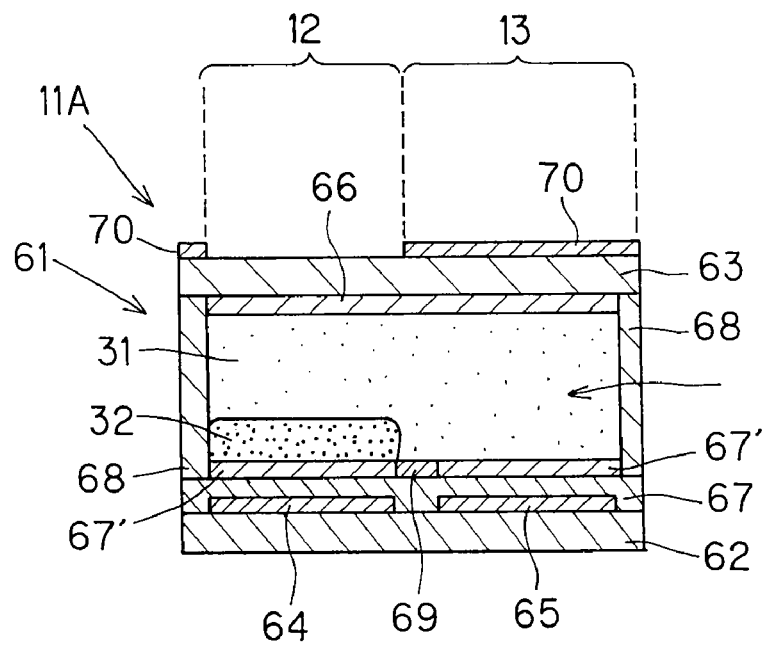
FIG. 12 is illustrative in longitudinal section, as in FIG. 2, of a further embodiment of the display system according to the invention.

In this way such an inventive display system as shown in FIG. 12 was fabricated. In this display system, the water droplet contact angles of the wall portion, the memory layer and the coating layer, an index to hydrophilicity, were about 55°, about 80° and about 113° respectively, as described above.

As in Example 3, the display performance of the fabricated display system was estimated while the $1^{st}$-A and $1^{st}$-B electrodes to which direct-current voltage was applied at the second electrode (common electrode) were optionally selected. As a consequence, any desired figure of "0" to "9" could be displayed by reflected light or the blue of the oil (colored dodecyldecane). Even after the applied voltage was shut off, the same display state could be kept for 10 days or longer, indicating that there was an excellent memory capability achieved.

POSSIBLE UTILIZATION IN THE INDUSTRY

The present invention is applicable to fields for which memory capability is needed.

I claim:

1. A display system built up of at least one display cell comprising an assembly which has at least a first electrode and a second electrode and in which there are mutually non-miscible first and second liquids filled, wherein either one of said first electrode and said second electrode is electrically insulated from said first and second liquids, said first liquid has electrical conductivity or polarity, and voltage is applied to one or both of said first electrode and said second electrode, whereby said first liquid and said second liquid vary in position to produce a display, characterized in that:

said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on a side of one substrate that faces said liquid confining space in an electrically independent way, an insulating layer for covering said $1^{st}$-A electrode and said $1^{st}$-B electrode, an intermediate partition located at a boundary site between said $1^{st}$-A electrode and said $1^{st}$-B electrode, and said second electrode is located on another substrate that faces said liquid confining space, wherein said $1^{st}$-A electrode and said $1^{st}$-B electrode are electrically insulated from said first liquid and said second liquid; at a voltage applied between said $1^{st}$-A electrode and said second electrode or between said $1^{st}$-B electrode and said second electrode, said second liquid goes over said intermediate partition in such a way as to be able to move between on said $1^{st}$-A electrode and on said $1^{st}$-B electrode; said intermediate partition is a liquid retainer means which, even after the applied voltage is shut off at a position where said first liquid and said second liquid have moved to, permits said first liquid and said second liquid to be held at the position where they have moved to, producing memory capability; and there is a specific relation: $\theta 1 < \theta 2 \leq \theta 3$ where $\theta 1$ is an angle of contact with a water droplet indicative of hydrophilicity of a site of said wall portion exposed in said assembly, $\theta 2$ is an angle of contact with a water droplet indicative of hydrophilicity of said intermediate partition, and $\theta 3$ is an angle of contact with a water droplet indicative of hydrophilicity of said insulating layer.

2. The display system of claim 1, wherein said intermediate partition has a height enough to keep said second liquid resting on said $1^{st}$-A electrode or said $1^{st}$-B electrode from going over it when the applied voltage is shut off.

3. The display system of claim 1, wherein a desired pattern of light block film is provided externally of said transparent substrate on a display viewing side.

4. The display system of claim 1, wherein said second liquid is colored oil.

5. The display system of claim 4, wherein there is a reflection type display where light reflected from within said display cell is viewed, and the colored oil that is said second liquid filled in each display cell is any one of yellow, magenta, and cyan.

6. The display system of claim 4, wherein there is a transmission type display where light transmitting through said display cell is viewed, said first liquid is colored water while the colored oil that is said second liquid is a light blocking black oil.

7. The display system of claim 1, wherein said $1^{st}$-A electrode and said $1^{st}$-B electrode are identical in configuration and position per said display cell.

8. A display system built up of at least one display cell comprising an assembly which has at least a first electrode and a second electrode and in which there are mutually non-miscible first and second liquids filled, wherein either one of said first electrode and said second electrode is electrically insulated from said first and second liquids, said first liquid has electrical conductivity or polarity, and voltage is applied to one or both of said first electrode and said second electrode, whereby said first liquid and said second liquid vary in position to produce a display, characterized in that:

said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on a side of one substrate that faces said liquid confining space in an electrically independent way, an insulating layer for covering said $1^{st}$-A electrode and said $1^{st}$-B electrode, an intermediate partition located at a boundary site between said $1^{st}$-A electrode and said $1^{st}$-B electrode to divide said liquid confining space in a direction along surfaces of said substrates, and said second electrode is located on another substrate that faces said liquid confining space, wherein said $1^{st}$-A electrode and said $1^{st}$-B electrode are electrically insulated from said first liquid and said second liquid; said intermediate partition has an opening that becomes a liquid flow passage; at a voltage applied between said $1^{st}$-A electrode and said second electrode or between said $1^{st}$-B electrode and said second electrode, said second liquid passes through said opening in said intermediate partition in such a way as to be able to move between on said $1^{st}$-A electrode and on said $1^{st}$-B electrode; said intermediate partition is a liquid retainer means which, even after the applied voltage is shut off at a position where said first liquid and said second liquid have moved to, permits said first liquid and said second liquid to be held at the position where they have moved to, producing memory capability; and there is a specific relation: $\theta 1 < \theta 2 \leq \theta 3$ where $\theta 1$ is an angle of contact with a water droplet indicative of hydrophilicity of a site of said wall portion exposed in said assembly, $\theta 2$ is an angle of contact with a water droplet indicative of hydrophilicity of said intermediate partition, and $\theta 3$ is an angle of contact with a water droplet indicative of hydrophilicity of said insulating layer.

9. The display system of claim 8, wherein said second liquid has a surface tension of 10 to 73 dyne/cm at 20° C., and said opening in said intermediate partition has a width of 1 to 1,000 μm.

10. The display system of claim 8, wherein a desired pattern of light block film is provided externally of said transparent substrate on a display viewing side.

11. The display system of claim 8, wherein said second liquid is colored oil.

12. The display system of claim 11, wherein there is a reflection type display where light reflected from within said display cell is viewed, and the colored oil that is said second liquid filled in each display cell is any one of yellow, magenta, and cyan.

13. The display system of claim 11, wherein there is a transmission type display where light transmitting through said display cell is viewed, and said first liquid is colored water while the colored oil that is said second liquid is a light blocking black oil.

14. The display system of claim 8, wherein said $1^{st}$-A electrode and said $1^{st}$-B electrode are identical in configuration and position per said display cell.

15. A display system built up of at least one display cell comprising an assembly which has at least a first electrode and a second electrode and in which there are mutually non-miscible first and second liquids filled, wherein either one of said first electrode and said second electrode is electrically insulated from said first and second liquids, said first liquid has electrical conductivity or polarity, and voltage is applied to one or both of said first electrode and said second electrode, whereby said first liquid and said second liquid vary in position to produce a display, characterized in that:
said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on a side of one substrate that faces said liquid confining space in an electrically independent way, an insulating layer for covering said $1^{st}$-A electrode and said $1^{st}$-B electrode, a memory layer positioned at a boundary site between said $1^{st}$-A electrode and said $1^{st}$-B electrode, and said second electrode is located on another substrate that faces said liquid confining space, wherein said $1^{st}$-A electrode and said $1^{st}$-B electrode are electrically insulated from said first liquid and said second liquid; at a voltage applied between said $1^{st}$-A electrode and said second electrode or between said $1^{st}$-B electrode and said second electrode, said second liquid goes over said memory layer in such a way as to be able to move between on said $1^{st}$-A electrode and on said $1^{st}$-B electrode; said memory layer is a liquid retainer means which, even after the applied voltage is shut off at a position where said first liquid and said second liquid have moved to, permits said first liquid and said second liquid to be held at the position where they have moved to, producing memory capability; and there is a specific relation: $\theta 1 < \theta 2 \leqq \theta 3$ where $\theta 1$ is an angle of contact with a water droplet indicative of hydrophilicity of a site of said wall portion exposed in said assembly, $\theta 2$ is an angle of contact with a water droplet indicative of hydrophilicity of said memory layer, and $\theta 3$ is an angle of contact with a water droplet indicative of hydrophilicity of said insulating layer.

16. The display system of claim 15, wherein said memory layer has electrical insulation.

17. The display system of claim 15, wherein said insulating layer has a covering layer thereon, said memory layer is positioned at the boundary site between said $1^{st}$-A electrode and said $1^{st}$-B electrode and on a portion of said insulating layer with none of said covering layer formed, and an angle of contact with a water droplet, $\theta 3'$, indicative of hydrophilicity of said covering layer is greater than the angle of contact with a water droplet, $\theta 2$, indicative of hydrophilicity of said memory layer.

18. The display system of claim 15, wherein said memory layer is configured as jutting out toward said liquid confining space side.

19. The display system of claim 15, wherein a desired pattern of light block film is provided externally of said transparent substrate on a display viewing side.

20. The display system of claim 15, wherein said second liquid is colored oil.

21. The display system of claim 20, wherein there is a reflection type display where light reflected from within said display cell is viewed, and the colored oil that is said second liquid filled in each display cell is any one of yellow, magenta, and cyan.

22. The display system of claim 20, wherein there is a transmission type display where light transmitting through said display cell is viewed, and said first liquid is colored water while the colored oil that is said second liquid is a light blocking black oil.

23. The display system of claim 15, wherein said $1^{st}$-A electrode and said $1^{st}$-B electrode 1 are identical in configuration and position per said display cell.

24. A display medium comprising at least one display system as recited in claim 1, characterized by comprising:
an input terminal for feeding power and signals from external equipment to each display cell in said display system, wherein at said input terminal said display medium can be connected to or disconnected from said external equipment.

25. A display medium comprising at least one display system as recited in claim 8, characterized by comprising:
an input terminal for feeding power and signals from external equipment to each display cell in said display system, wherein at said input terminal said display medium can be connected to or disconnected from said external equipment.

* * * * *